US012435565B2

(12) United States Patent
Seshasai

(10) Patent No.: US 12,435,565 B2
(45) Date of Patent: Oct. 7, 2025

(54) HIGH WIND TOLERANT TRACK ASSEMBLY FOR A MOTORIZED RETRACTABLE SCREEN

(71) Applicant: Kolar L. Seshasai, Bradenton, FL (US)

(72) Inventor: Kolar L. Seshasai, Bradenton, FL (US)

( * ) Notice: Subject to any disclaimer, the term of this patent is extended or adjusted under 35 U.S.C. 154(b) by 321 days.

(21) Appl. No.: 17/668,776

(22) Filed: Feb. 10, 2022

(65) Prior Publication Data

US 2023/0250692 A1 Aug. 10, 2023

(51) Int. Cl.
*E06B 9/58* (2006.01)
*E06B 9/42* (2006.01)

(52) U.S. Cl.
CPC ................ *E06B 9/581* (2013.01); *E06B 9/42* (2013.01); *E06B 2009/587* (2013.01)

(58) Field of Classification Search
CPC ...... E06B 9/581; E06B 2009/587; E06B 9/42; E06B 2009/585; E06B 9/327; E06B 9/40
See application file for complete search history.

(56) References Cited

U.S. PATENT DOCUMENTS 5,526,865 A * 6/1996 Coenraets ................. E06B 9/58 160/273.1
7,793,702 B2 9/2010 Biewer et al.
9,719,292 B1 8/2017 James et al.
2012/0255683 A1 10/2012 Komatsu et al.
2012/0255687 A1* 10/2012 Komatsu ................. E06B 9/581 160/310
2018/0187482 A1* 7/2018 Berman .................. E06B 9/581
2019/0048658 A1* 2/2019 Garcia Hernandez .... E06B 9/44
2022/0325578 A1* 10/2022 Collins ..................... E06B 9/62

FOREIGN PATENT DOCUMENTS

CN 106285439 A * 1/2017
FR 3062413 A1 8/2018
IT 201800007221 A1 1/2020
KR 102084169 B1 5/2020

OTHER PUBLICATIONS

Machine translation of CN106285439A (Year: 2017).*
Extended European Search Report dated Jul. 14, 2023, issued in corresponding European Patent Application No. 23155867.7 (8 pgs.).

* cited by examiner

*Primary Examiner* — Abe Massad
*Assistant Examiner* — Jeremy C Ramsey
(74) *Attorney, Agent, or Firm* — Pillsbury Winthrop Shaw Pittman, LLP

(57) ABSTRACT

A track assembly including a channel section in a fixed track having a screen receiver receiving a portion of a screen therein and at least one spring inserted in the length of the channel section. The at least one spring has a pre-defined spring rate which is designed to allow movement of the screen receiver in the channel in a first direction and back, depending upon an amount of tension or force applied thereto, e.g., as a result of wind pressure due to inclement weather that is applied to the screen. The spring(s) may be compressed by the screen receiver in such instances that force is applied thereto, and the compressed spring is configured to force the screen receiver back in an opposite direction when force is reduced or released.

21 Claims, 10 Drawing Sheets

HIGH WIND TOLERANT TRACK ASSEMBLY FOR A MOTORIZED RETRACTABLE SCREEN

BACKGROUND

Technical Field

The present disclosure relates to the field of tracks and track assemblies for motorized retractable screens, and more particularly, to self-adjusting tracks and track assemblies.

Description of Related Art

Over the past twenty-five plus years, motorized retractable screens have gained popularity due to their utility and versatility for temporarily enclosing spaces. For example, many restaurants and other businesses having patios/outdoor areas utilize retractable screens to temporarily enclose these areas, thereby creating environmentally controlled areas that are shielded from inclement weather conditions (ex: windy, sunny and/or wintry weather conditions).

Current methods primarily have fixed tracks and the screens are positioned therein such that they are taut. Many problems exist with such fixed designs, as they are intolerant to high winds and screen shrinkage, etc., thereby making the screens inoperable under high wind conditions and/or having a tendency to bind and wrinkle and tear over time. As such, the screens and tracks require regular maintenance and adjustments to overcome the above issues.

U.S. Pat. No. 9,719,292 B1, which is hereby incorporated by reference in its entirety herein, is an example of an attempt to overcome some of these issues, but is still limited. Like the fixed track systems, the '292 patent does not provide any dimensional tolerance accommodation for installation for the distance between the tracks that are on each side of the screen making the installation equally difficult. All the magnets may not be engaged and is basically two positions for the screen with magnets engaged and with magnets disengaged, also creating annoying clicking noise each time the magnets engage and disengage.

While these retractable screens have great versatility and utility, several problems exist with the currently marketed products. As examples, the currently marketed tracks and track assemblies are fixed tracks that maintain the screen in a tight, aesthetically pleasing manner once the screen is installed. These fixed tracks allow for extraordinarily little play for expansion or contraction due to shrinkage or under wind load conditions when the screen wants to deflect in the out of plane direction a little looking like a bulging shape. Consequently, during high wind conditions, these screens may twist, buckle, and/or warp the fixed tracks and track assemblies permanently; can damage the screen by tearing or stretching; screen edges, i.e., the zipper edge or the keder edge can slip off the tracks; or combination of all of these. These problems lead to frequent and costly repairs and at some point, may require replacement of the fixed tracks and track assemblies and the screens.

SUMMARY

It is an aspect of this disclosure to provide a track assembly which includes: a track configured to be fixed to a structure, the track having an elongate channel having an open side, an end wall, an interior, and two side walls. The interior of the elongate channel has a first region and a second region each provided within the two side walls. The first region is defined between the end wall and an interior partition wall that extends between and connects to the two side walls. The second region is defined from the interior partition wall towards the open side, and the two side walls extending from at least the interior partition wall to the open side. A screen receiver and at least one spring are positioned in the elongate channel. The screen receiver is configured to receive a portion of a screen therein. The at least one spring is designed for (a) compression during movement of the screen receiver in the second region in a first direction upon application of sufficient force thereto and (b) expansion to force the screen receiver towards a second direction opposite the first direction when the application of force is reduced. The at least one spring has a spring rate between 5 lbs/inch and 300 lbs/inch.

In another aspect, the at least one spring of the aforementioned track assembly is configured to compress or deflect a minimum of approximately 0.25 inches under wind pressure as a result of nominal wind speed to a maximum of approximately 6.0 inches under wind pressure as a result of high wind speed thereto.

Other features and advantages of the present disclosure will become apparent from the following detailed description, the accompanying drawings, and the appended claims.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION OF EMBODIMENT(S)

Figure 1:
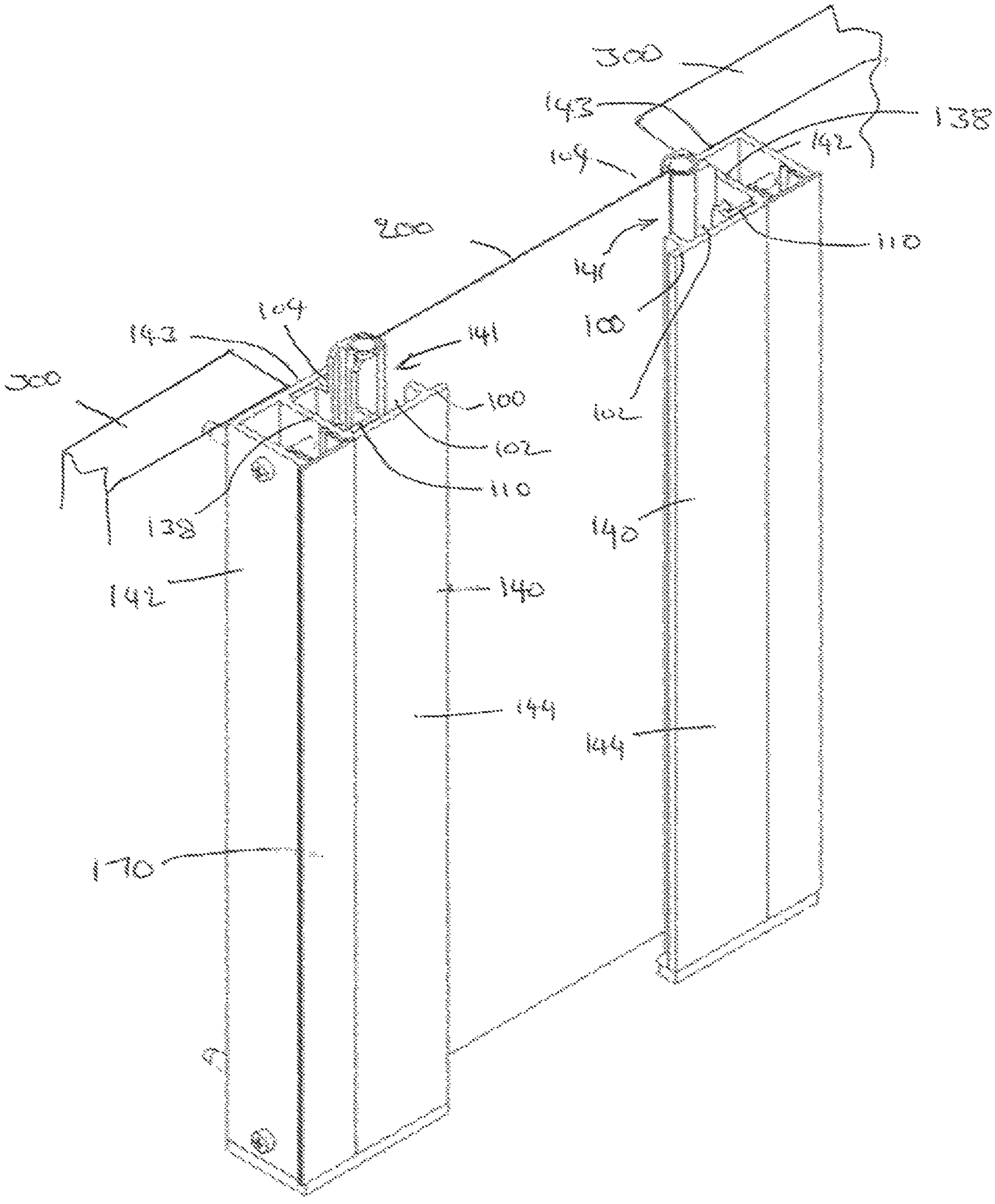
FIG. 1 is a perspective view of an assembled track assembly including two track assemblies with elongate channels, and a motorized, retractable screen attached thereto, in which the screen has a tight, aesthetically pleasing appearance, in accordance with an embodiment.

This disclosure relates generally to the field of tracks and track assemblies for retractable screens used for sunshade, privacy, wind, and other weather protection.

As noted in the background, several prior art systems are intolerant to high winds and screen movement, and lack dimensional tolerance. The disclosed track assembly is designed to eliminate and/or reduce many of these aforementioned problems by allowing for flexion relative to and in and out in the plane of the screen as needed under wind or shrinkage conditions, and reduce edge force on the screens, as well as friction, to make the screen and assembly operable at higher wind force conditions, while also keeping the screen wrinkle free and aesthetically pleasing and extending the life of the screens and the associated motor. As disclosed herein, such is achieved by having a moveable track portion, also called a spring track keder guide or a "screen receiver" throughout this disclosure, under spring-loaded condition within a fixed, elongate track (also called a track housing. Such a fixed track may be used alone, connecting to one side (or a single side) of a screen, or with another track (of similar or different construction) to connect to both sides of a screen. At least one spring is provided in the track assembly and designed for compression during movement of the screen receiver in the fixed track in a first direction upon application of force thereto, and expansion to force the screen receiver back in a direction opposite to the first direction when the application of force is reduced.

A spring arrangement of many different varieties may be sized for range of wind forces and screen strength conditions and appropriate amount of flexing for any size screens. In addition to solving many of the prior art problems, use of these track assemblies will also extend the range of current widths and height of current retractable screen designs. In addition to improving the operation of the retractable screen and its life, this disclosure makes installation a bit easier by being able to have a larger tolerance for the distance between the end tracks having a range of preload on the added spring(s) and reduces maintenance issues.

Therefore, it is an object of the disclosure to provide tracks and track assemblies that overcome the problems of currently marketed fixed tracks and fixed track screen assemblies. The disclosed tracks and track screen assemblies utilize a track that is designed to assist in keeping an attached or connected screen taut with the help of one or more springs that are configured to compress to a particular level (or within a particular range) depending on the loading (force) on the screens and allowing for expansion or contraction, as necessary. When compared to currently marketed fixed tracks and fixed track screen assemblies, this spring-loaded movable arrangement advantageously results in less frequent maintenance of the disclosed tracks/track assemblies while simultaneously increasing screen operating range under various wind conditions and increasing lifespan.

In the case where two track assemblies are utilized together, for example, the disclosed assemblies utilize a novel arrangement of springs that allow a screen attached thereto to compress while under high wind pressure conditions bringing the moveable track portions (or screen receivers) closer to each other within their respective fixed tracks and, as the high wind pressure on the screen subsides, the screen receivers move relatively apart constantly tensioning the screen to provide for an aesthetically pleasing, tight screen at all times. Of course, as one having skill in the art would understand, similar effects may be obtained when utilizing a single disclosed track assembly to hold one side of a screen along with another track to hold the other side of the screen.

As another advantage and in direct contrast to the currently marketed fixed tracks and fixed track assemblies, the disclosed tracks and track assemblies do not have dimensional limitations of screens that can be used in these tracks/track assemblies, and screens covering extremely wide and tall openings, including dimensions of up to 36 feet wide by 30 feet high, may be used with the disclosed tracks and track assemblies.

Specifically disclosed is a spring-loaded track assembly including a track configured to be fixed to a structure (referred to herein as a "fixed track" for explanatory purposes), the track having an elongate channel having an open side, an end wall, an interior, and two side walls. The elongate channel of this track is fixed once attached to a structure or wall. At least one spring is secured or held within the interior of the elongate channel. A compartment or region is defined within the elongate channel. A screen receiver, which is configured to receive a portion (e.g., keder) of a screen therein, is disposed within the compartment or region and may apply a preload on the one or more springs, e.g., due to application of force to the received/attached screen. As understood by one of skill in the art, a screen keder (or "keder") is a mechanical attachment that is attached to (e.g., welded or sewn) and/or formed along an edge of the screen fabric or mesh, for attaching the screen to a track or rail, and thus such is not explained in detail herein. The screen receiver may be an elongate track that extends within a length of the elongate channel of the fixed track. The at least one spring has a pre-defined spring rate which is designed to allow movement of the screen receiver in the channel in a first direction, e.g., between a first position and a second position, depending upon an amount of force applied thereto.

Throughout this disclosure, there is reference to wind speeds, wind pressure, and the effects of the same on the disclosed track assembly. Wind speeds are typically categorized in ranges, which result in a varying wind pressure. Depending upon placement of a screen and the disclosed track assembly in or on a building, the wind pressure that is applied thereto is reduced. Factors such as velocity pressure coefficient (0.85 to 0.98), topographic factor (0.85 to 0.98), and directionality factor (0.85 to 0.95) affect the actual wind pressure that may be applied to the disclosed track assembly (and an attached screen).

For illustrative purposes, the following chart represents examples of wind speed, wind pressure, and actual wind pressure (applied to the screen) considered throughout this disclosure:

| | Use (up to) Wind speed, V mph | Wind Pressure, P P = 0.00256 * V * V psf (pounds per square foot) | Actual wind pressure (Using 0.9 as an example for each of the velocity pressure coefficient, topographic factor, and directionality factor) |
|---|---|---|---|
| Hurricane category 1 - 74 to 95 mph | 95 | 23.1 | 16.8 |
| Hurricane category 2 - 96 to 110 mph | 110 | 31.0 | 22.6 |
| Hurricane category 3 - 111 to 129 mph | 129 | 42.6 | 31.1 |
| Hurricane category 4 - 130 to 156 mph | 156 | 62.3 | 45.4 |
| Hurricane category 5 - 157 or higher mph | 160 | 65.5 | 47.8 |
| Nominal wind | 15 | 0.6 | 0.4 |
| Moderate wind | 25 | 1.6 | 1.2 |
| High wind | 40 | 4.1 | 3.0 |
| Extreme wind | 60 | 9.2 | 6.7 |
| Hurricane cat 4 to 5 transition speed | 156.3 | 62.5 | 45.6 |

As evidenced by the chart, the wind pressure P is determined based on the wind speed, and the actual wind pressure is approximately 25% to 35% less than the wind pressure P, once the factors and coefficients are applied.

Generally, the larger the wind speed, the larger the distance for travel (i.e., compression or depression) for the spring(s). Further, the larger the opening or doorway which the screen extends across, the larger the compression or deflection. In this case, any change of wind speed (V, in mph), wind pressure (P, in psf), screen width (ft) and/or screen height (ft), screen stretch (%), spring travel (inches), and/or spring length (ft) affects a pull force on the screen receiver/keder (lbs), screen bulging amount (ft), and a desirable spring rate for the disclosed design. Accordingly, it has been observed that at a given pressure on screen, as the stretch increases, the force on the keder and screen receiver reduces (as does the force on the track). As the force on the keder is lowered, then damage to the track(s) and screen are lowered, and the screen itself operates more easily. Herein, in order to further reduce the force on the keder and thus the screen receiver, spring(s) are added in the track as part of the assembly to compensate for wind pressure and thus force applied to the keder and frame. The spring travel—e.g., compression or deflection amount of the spring(s)—further affects the force on the screen and its keder, and thus the screen receiver and track. It has been determined that as spring travel increases, the force on the keder is reduced. Also, it has been determined that as wind speed increases, the force on the keder may be maintained (or reduced; i.e., such that keder force is similar to a force applied at lower wind speeds) by increasing the spring travel. Additionally and/or alternatively, as a screen width (measured in a horizontal direction) is increased, the force on the keder may also increase, but the keder force may similarly be maintained (or reduced) by increasing spring travel with the screen width.

As a result, this disclosure focuses on reducing force that is applied to the screen receiver (and keder) under extreme wind conditions and/or higher (i.e., hurricane winds), via one or spring(s) placed into the track assembly, and considers these aforementioned factors with regards to selecting spring rate and the compression/deflection of the spring(s) used as part of the disclosed track assembly.

In accordance with embodiments herein, the interior of the elongate channel of the track assembly has a first region and a second region each provided within two side walls. The first region may be defined between an end wall and an interior partition wall that extends between and connects to the two side walls. The second region may be defined from the interior partition wall towards an open side of the elongate channel, and the two side walls extend from at least the interior partition wall to the open side. In an embodiment, the screen receiver is positioned in the second region. In an embodiment, the at least one spring is positioned in the second region. In an embodiment, the at least one spring is positioned in the first region. In an embodiment, both the screen receiver and the at least one spring are positioned in the second region. In an embodiment, the screen receiver is positioned in the second region and the at least one spring is positioned in the first region.

As described herein, during operation, i.e., when the track assembly is installed and has a screen attached thereto, the spring(s) may be compressed as force (e.g., wind pressure as a result of wind speed/wind load thereon) on a screen increases. The movable screen receiver is disposed within the compartment or region such that as the wind load increases, the spring(s) compress in proportion as the movable track moves closer towards the open side of the elongate channel due to the applied force, and vice versa. That is, the screen receiver is moved in the first direction (e.g., from a first (or normal/default) position to a second (or active) position) during application of force [to the screen]. In the second position, the spring(s) is compressed upon application of sufficient force (to overcome the spring rate). Based on the amount of compression, the spring force of the spring(s) is designed to force the screen receiver back to its first position. That is, when the application of force is reduced, the compressed spring(s) expands to force the screen receiver towards a second direction that is opposite the first direction.

The spring rate, also referred to as spring constant, is the amount of weight or force (in this case, in pounds (lbs)) needed to compress a spring by one inch. Spring rate can also be defined as the estimation of the amount of force needed to compress a spring to a specific distance. In this disclosure, the spring rate of the spring(s) as defined herein allows for flexibility and movement of the screen receiver and attached screen within the elongate channel during application of force (e.g., during inclement weather), while also applying a counteracting force to position the screen receiver and screen into a normal or default position. In embodiments herein, the spring(s) may utilize a lower spring rate (or softer spring) and include longer spring travel to accommodate and counteract forces applied to the screen and track.

For illustrative purposes only, the chart below shows exemplary calculations for selected wind speeds, screen widths and heights, spring rates, and selected amounts of spring compression:

| | | | | | | | | | | | | | |
|---|---|---|---|---|---|---|---|---|---|---|---|---|---|
| Wind speed | V | mph | | | 156.3 | 156.3 | 95 | 95 | 25 | 25 | 35 | 35 | 156.3 |
| Wind Pressure | P | psf | P = 0.00256 * V * V | | 62.5 | 62.5 | 23.1 | 23.1 | 1.6 | 1.6 | 3.1 | 3.1 | 62.5 |
| Screen width | L | feet | | | 16 | 16 | 16 | 10 | 16 | 24 | 24 | 24 | 24 |
| Screen height | H | feet | | | 10 | 10 | 10 | 8 | 10 | 10 | 10 | 10 | 10 |
| Half width of screen span | B | feet | L/2 | | 8 | 8 | 8 | 5 | 8 | 12 | 12 | 12 | 12 |
| Equivalent center load | W= | P * L/8 | | | 125 | 125 | 46 | 29 | 3 | 5 | 9 | 9 | 188 |
| Equivalent center load for full height | | W * H | | | 1251 | 1251 | 462 | 231 | 32 | 48 | 94 | 94 | 1876 |
| End Reactions | R= | W/2 | | | 62.5 | 62.5 | 23.1 | 14.4 | 1.6 | 2.4 | 4.7 | 4.7 | 93.8 |
| Screen fabric stretch case (current designs)- | | | | | | | | | | | | | |
| Screen fabric stretch | St % | | | | 1.5% | 1.5% | 1.5% | 2.0% | 0.25% | 0.25% | 0.25% | 0.25% | 2.0% |
| Screen stretch for half width | S | feet | B * St | | 0.12 | 0.12 | 0.12 | 0.10 | 0.02 | 0.03 | 0.03 | 0.03 | 0.24 |
| Half screen width with stretch | Es | feet | B + S | | 8.12 | 8.12 | 8.12 | 5.10 | 8.02 | 12.03 | 12.03 | 12.03 | 12.24 |
| Bulging of screen | Ds | feet | Right angle triangle calculation | | 1.39 | 1.39 | 1.39 | 1.00 | 0.57 | 0.85 | 0.85 | 0.85 | 2.41 |
| Pull force on Keder 1 ft long | F | lbs | R * Es/Ds | | 365 | 365 | 135 | 117 | 23 | 23 | 44 | 44 | 317 |
| Combined screen stretch and spring compression case- | | | | | | | | | | | | | |
| Spring compression | C | inches | | | 0.5 | 1 | 1 | 0.5 | 1 | 0.5 | 1.75 | 3 | 6 |
| Spring compression | C | feet | C/12 | | 0.042 | 0.083 | 0.083 | 0.042 | 0.083 | 0.042 | 0.146 | 0.250 | 0.500 |
| Screen stretch for half width | S | feet | B * St | | 0.12 | 0.12 | 0.12 | 0.10 | 0.02 | 0.03 | 0.03 | 0.03 | 0.24 |
| Half screen width with stretch | Es | feet | B + S | Diagonal | 8.12 | 8.12 | 8.12 | 5.10 | 8.02 | 12.03 | 12.03 | 12.03 | 12.24 |
| Half width of screen span | Bc | feet | L/2 − C | Base | 7.958 | 7.917 | 7.917 | 4.958 | 7.917 | 11.958 | 11.854 | 11.750 | 11.500 |
| Screen deflection (bulging) | Dt | feet | Height using triangle formula | | 1.612 | 1.806 | 1.806 | 1.194 | 1.283 | 1.311 | 2.049 | 2.580 | 4.191 |
| Pull force on Keder 1 ft long | F | lbs | R * Es/Dt | | 315 | 281 | 104 | 62 | 10 | 22 | 28 | 22 | 274 |
| Force on each spring | | lbs | F/2 | | 157 | 141 | 52 | 31 | 5 | 11 | 14 | 11 | 137 |
| Spring rate for one foot long spring | | lbs/in | SR = F/2/C | | 315 | 141 | 52 | 62 | 5 | 22 | 8 | 4 | 23 |
| Spring length | SL | ft | SL | | 4 | 4 | 4 | 4 | 4 | 4 | 4 | 5 | 4 |
| Spring rate for spring length used | | lbs/in | SR * SL | | 1260 | 562 | 208 | 247 | 20 | 88 | 32 | 18 | 91 |

Altering a maximum spring compression amount in turn affects a highest value of the spring rate at which movement is affected at a particular wind pressure/wind (in this case, the spring compression and spring rate are inversely proportional, i.e., as the spring compression is lowered, the spring rate is increased). While the spring rate (lbs/in) could be set to a highest value in order to fully withstand the wind speed and wind pressure [with little to no movement/compression of the spring], in a practical application as disclosed herein, the spring rate is designed to be set a lower rate, so that the spring(s) are designed to effectively "bottom out" (i.e., hit a maximum compression) at lower wind speeds and wind pressures. Accordingly, at a lower set spring rate, the disclosed design allows for the spring(s) to effectively compress/deflect between rest, minimum, and maximum positions at lower wind pressures (wind speeds) thereby reducing forces applied to the screen receiver (keder) and screen as well as the track itself, even if higher wind pressure (speed) is applied. This in turn reduces friction and noise that is caused by movement of the screen receiver within the elongated track, since the spring(s) is/are activated to absorb or dampen motion and applied force.

In accordance with embodiments herein, the spring rate and the minimum/maximum spring compression for the spring(s) in the track assembly may be selected based on nominal (e.g., up to ~15 mph) and high wind conditions (e.g., ~40 mph), while considering the aforementioned wind speed, wind pressure, screen with and height, etc. factors. That is, as noted previously, the maximum movement/compression or bottoming out of the spring(s) may be set based on a relatively lower wind speed and wind pressure, i.e., in this case, pressure as a result of high wind speed (over 25 mph and up to ~40 mph), yet it should be understood that this max/bottoming out at at least high wind speed allows for compensation and movement at higher winds (e.g., extreme wind speed, or more) as well. A skilled person in the art will understand that wind pressure and speeds may vary, thus varying movement of the spring(s).

The at least one spring has a spring rate between 5 lbs/inch and 300 lbs/inch (both inclusive), in accordance with embodiments herein. In accordance with another embodiment, the at least one spring has a spring rate between 5 lbs/inch and 100 lbs/inch. In accordance with another embodiment, the at least one spring has a spring rate between 10 lbs/inch and 100 lbs/inch. In yet another embodiment, the at least one spring has a spring rate between 5 lbs/inch and 25 lbs/inch.

In an embodiment, the spring(s) are configured to compress or deflect a minimum of approximately 0.25 inches +/−0.1 inches under wind pressure as a result of nominal wind speed and a maximum of approximately 8.0 inches +/−0.25 inches under wind pressure as a result of high wind speed (and/or higher/more). In one embodiment, the at least one spring allows compression or deflection of a minimum of approximately 0.25 inches +/−0.1 inches under wind pressure as a result of nominal wind speed to a maximum of approximately 6 inches +/−0.25 inches under wind pressure as a result of high wind speed (and/or higher/more). In another embodiment, the at least one spring allows compression or deflection of a minimum of approximately 0.5 inches +/−0.1 inches under wind pressure as a result of nominal wind speed to a maximum of approximately 3 inches +/−0.25 inches under wind pressure as a result of high wind speed (and/or higher/more). In yet another embodiment, the at least one spring allows compression or deflection of a minimum of approximately 0.25 inches +/−0.15 inches under wind pressure as a result of nominal wind speed to a maximum of approximately 0.75 inches +/−0.15 inches under wind pressure as a result of high wind speed (and/or higher/more). However, such distances are exemplary only and not intended to be limiting.

In embodiments herein, when spring(s) are installed in the elongate channel, they are secured with minimal (if any) compression. In an embodiment, when no force is applied to the screen receiver, the spring(s) may be interference fit within the elongate channel, without any preload thereon. In one embodiment, the spring(s) may be minimally compressed about approximately 0.005 inches when installed.

When wind pressure (force) is applied to the screen, and thus the screen receiver(s), the screen receiver(s) is moved in the channel and acts to compress the spring(s) therein. Thus, the spring(s) are compressed or deflected a distance from a neutral or normal position (i.e., position under no load).

In an embodiment where wave springs are employed, the maximum deflection amount may be defined as the free height of a wave minus the spring strip thickness.

In accordance with an embodiment, besides the wind pressure (and resulting force) that is applied to the screen and keder and thus the track assembly, the minimum/maximum compression or deflection amount of the spring(s) is dependent upon at least a size of the elongate channel, the size of the screen attached therein, and the spring(s) mounting therein. A person having ordinary skill in the art understands that factors such as screen width, height, wind speed, screen fabric stretch, spring rates and travel distances may affect the compression/deflection of the spring. In an embodiment, in addition to the wind pressure and forces applied thereto, the minimum/maximum compression or deflection amount of the spring(s) is dependent upon placement of the spring(s) and the screen receiver within the elongate channel. In an embodiment, the minimum/maximum compression or deflection amount of the spring(s) is dependent upon a depth (or width) of the second region formed in the elongate channel. In one embodiment, the minimum/maximum compression or deflection amount of the spring(s) is dependent upon a size of a pocket formed in the second region of the elongate channel that the spring(s) are mounted or secured in. In an embodiment, the minimum/maximum compression or deflection amount of the spring(s) is dependent upon a depth (or width) of the first region formed in the elongate channel.

As previously mentioned, and as shown in the chart, in an embodiment, the compression or deflection amount of the spring(s) is [further] dependent upon a size of the opening or doorway in which the screen extends. Generally, the larger the wind speed, the larger the distance for travel (i.e., compression or depression) for the spring(s). In an embodiment, the larger the opening or doorway which the screen extends across, the larger the compression or deflection.

As an example, when subjected to an applied sufficient force for nominal to high wind speeds, e.g., up to 40 mph, the spring(s) may be designed to have with a particular spring rate, e.g., 10 to 100 lbs/in, and to compress or deflect a minimum of approximately 0.25 inches under wind pressure as a result of nominal wind speed to a maximum of approximately 1 inch under wind pressure as a result of high wind speed. As the wind speeds, and thus the applied wind pressure/force, increase, the selection for the desired spring rate and compression/deflection (min and max) may also increase, or may remain the same or similar. As another example, under very high wind speeds (hurricane category 1 or 2), the spring(s) may be designed to compress or deflect a minimum of approximately 0.25 inches under wind pressure as a result of nominal wind speed to a maximum of approximately 2 inches under wind pressure as a result of high wind speed, with a similar spring rate. In accordance with an embodiment, the spring rate and the spring(s) compression or deflection is proportional to the extension (width) of the screen (between two track assemblies), as well as the anticipated force (from the winds) that may be applied to the screen and track assembly. For example, for openings or doorways that are less than 20 feet which are subject to high winds, like hurricane winds, the spring(s) may be designed to have with a particular spring rate and to compress or deflect a minimum of approximately 1 inch at nominal wind speeds to a maximum of approximately 2 inches for extreme wind speeds. The same configuration of spring(s) may be used for openings or doorways that are greater than 20 feet but subject to nominal wind speeds. Such distances are exemplary only and not intended to be limiting.

In certain instances, there may be a partition wall inside the fixed track creating a partition side for the screen receiver and spring(s) and an additional or secondary channel side. The additional/secondary channel side may be used for anchoring the track to a structure of an open space where the screens are being installed, in accordance with an embodiment. On the partition side, the interior of the elongate channel includes a first interior region or compartment and a second interior region or compartment provided within the two side walls, which are optionally parallel to one another. The first interior region may be defined between the end wall and an interior partition wall that extends perpendicularly between and connects to the two side walls. The second interior region may be defined from the interior partition wall towards the open side, and may be configured to receive the screen receiver and the at least one spring therein.

In certain aspects, on the secondary channel side of the tracks, there is an opening for the full length on one of the faces to access the anchors, and the track assembly further includes a removable elongate cover covering a length of the secondary channel. As an example, in an embodiment, the secondary channel has an elongate opening that is accessible in a direction perpendicular to the open side of the elongate channel. In accordance with an embodiment, a removable elongate cover for removably covering a length of the elongate opening of the first compartment or region is provided which extends parallel to the side walls when mounted to cover the elongate opening. Such cover may add aesthetic value, for example.

The screen receiver may be of any shape, symmetric or non-symmetric, primarily having a provision to capture the screen keder and stay within the fixed track and being movable in the plane of the screen. Movement of the screen receiver is controlled via the fixed track and as a result of the lateral wind or other force on the screen balanced by the spring(s) working against the screen receiver. In accordance with an embodiment, the screen receiver is Split-O shaped, i.e., C-shaped in cross section and includes an elongate channel having an opening that is accessible through the open side of the elongate channel. That is, the opening extends along a same direction as the open side of the elongate channel, when the screen receiver is placed within the fixed track. Accordingly, the opening of the elongate channel may be accessible in a direction that is through the open side and that is substantially parallel to at least one of the two side walls. In accordance with an embodiment, the opening of the C-shaped/Split-O shaped screen receiver is provided in a center thereof, such that the elongate channel is accessible through the open side of the elongate channel. The screen receiver, and more particularly the channel opening, are in certain aspects adapted to receive a screen interlock including, but not limited to a keder interlock, a Zipper interlock, a rope, a beaded chain, or any similar interlock known in the art associated with the disclosed retractable screens.

In certain aspects, the first and/or second interior region(s) of the elongate channel has a depth of approximately one inch. In embodiments, a second region 120 (see, e.g., FIG. 5) has a depth D1 of greater than one inch and up to, for example, approximately 2 inches, approximately 3 inches, approximately 4 inches, approximately 5 inches, or approximately 6 inches. In an embodiment, the depth D1 may be between approximately one inch to approximately 12 inches. In this case, the depth D1 of the second region refers to a measurement between a partition wall (see 147, 148 in FIG. 5)—or an edge of an open side (141 in FIG. 5), depending upon the channel design—and another partition wall (see 138 in FIG. 5), which receives the screen receiver therein. The depth D2 of the first region (see 160 in FIG. 5) is defined as a distance between the partition wall 138 and an end wall 142. The depth D2 of the first region may be approximately one to eight inches, for example. In one embodiment, the depth D2 of the first region is between approximately one inches and approximately two inches. In another embodiment, the depth D2 of the first region is approximately six inches to approximately eight inches. In an embodiment, the depth D2 of the first region may be dependent upon the location of the spring(s) within the elongate channel, e.g., in the case of the spring(s) being mounted in the second region, the depth D2 of the first region may be smaller (e.g., 1 to 4 inches), whereas in the case of the spring(s) being mounted in the first region the depth D2 may be larger (e.g., 6 to 8 inches). However, such distances are exemplary only and not intended to be limiting.

In accordance with an embodiment, the overall thickness OT (i.e., a distance between outer portions of side walls 143 and 144, defined in a perpendicular direction to an extension direction of the screen) of an elongate channel 140 may be from approximately one inch to approximately six inches. In an embodiment, the total depth TD (or overall width) of the track (i.e., where total depth is defined as a distance between an outer edge/wall of an end wall (142 in FIG. 2) and an edge of a partition wall (such as wall 147, 148 in FIG. 5 (or an outer edge/wall of an open side 141, depending upon the channel design)) may be from approximately one inch to approximately eight inches. In accordance with an embodiment, the total depth TD of the elongate channel 140 may be approximately 2 inches +/−0.5 inches to approximately 14 inches +/−0.5 inches. In one particular embodiment, the total depth is between approximately 2 inches to 8 inches, both +/−0.5 inches. Such distances are exemplary only and not intended to be limiting.

The at least one spring of the track assembly may be provided in the form of a wave spring, a coil spring, or a compression spring, in accordance with embodiments herein. In one embodiment, the track assembly includes at least two springs. For example, the screen receiver may include two sides, and each of the at least two springs may be positioned on either side of the screen receiver, within the fixed track, according to exemplary embodiment.

In one illustrative embodiment shown in the Figures, wave springs are used. Each wave of a wave spring has a "free height" or "free wave height" which is a distance that is defined between two planes along a wave; that is, the distance between a plane along a bottom portion of the wave and a plane along a top portion (i.e., along a curved portion) thereof. In an embodiment, the free height is between 0.4 inches and 0.7 inches. In certain aspects, the wave springs free wave height can be up to approximately 1 inch, approximately 2 inches, approximately 3 inches, approximately 4 inches, approximately 5 inches, or approximately 6 inches, e.g., to match with the size of a pocket (described briefly above and later below) within the track. That is, the free height of the waves of the wave spring (extending within the length of the track) may be proportional to a depth PD (see FIG. 5) of a pocket in which the spring is provided. In accordance with an embodiment, a wave spring lateral width WS (i.e., a distance from one side of a wave to the other, which may correspond to a lateral width of a pocket formed between one of the side walls [143, 144] of the elongated track and a portion of the screen receiver) can be as small as approximately 0.25 inches and as wide as approximately 2 inches. In an embodiment, the wave spring amplitude or wave height and/or the travel amount of the screen receiver can be from approximately 0.25 inches to approximately 2 inches. In one embodiment, the at least one spring allows deflection of at least approximately 0.5 inch and then returns. However, such distances are exemplary only and not intended to be limiting. The height of the spring corresponds to the amount of movement of the screen receiver, in accordance with an embodiment.

In certain aspects, the wave springs can be pre-mounted on the receiver with a rivet or clip or similar accessary to hold them in place during assembly.

In certain aspects not limiting to wave springs, as alternate designs to wave spring design described here, one or multiple coil springs attached to the screen receiver or one or multiple flat springs attached to the screen receiver can be used to provide the necessary compression and movement of the screen receiver.

In accordance with embodiments herein, the free height of the spring(s) may be proportional to a distance that a screen extends between two track assemblies when covering an opening or doorway, as previously discussed above. In embodiments, the free height of the spring(s) may be determined based upon anticipated forces that may be applied to the track assembly (and screen).

In certain aspects, the screen receiver is adapted to move in the plane of the screen horizontally within the region or compartment toward and away from the open side channel legs.

In certain aspects, a width of the screen receiver is less than a width of the region or compartment such that the screen receiver can be installed by sliding in from either end of the elongate channel.

In certain aspects, the elongate channel is open at a top and a bottom thereof, and the top and the bottom are covered with removable top and bottom covers, respectively.

Embodiments of the disclosure can include one or more or any combination of the above features and configurations. Additional features, aspects and advantages of the disclosure will be set forth in the detailed description which follows, and in part will be readily apparent to those skilled in the art from that description or recognized by practicing the disclosure as described herein. It is to be understood that both the foregoing general description and the following detailed description present various embodiments of the disclosure and are intended to provide an overview or framework for understanding the nature and character of the disclosure as it is claimed. The accompanying drawings are included to provide a further understanding of the disclosure and are incorporated in and constitute a part of this specification.

The present disclosure will now be described more fully hereinafter with reference to the accompanying drawings in which exemplary embodiments of the disclosure are shown. However, the disclosure may be embodied in many different forms and should not be construed as limited to the representative embodiments set forth herein. The exemplary embodiments are provided so that this disclosure will be both thorough and complete and will fully convey the scope of the disclosure and enable one of ordinary skill in the art to make, use and practice the disclosure. Like reference numbers refer to like elements throughout the various drawings.

Disclosed are movable screen receivers and track assemblies that utilize a novel spring arrangement in the track assemblies that allow one or more springs to compress and flatten and allow the screen receiver to move closer to an open end or open side of fixed track thereby allowing an attached screen to expand out of plane to a bubble like shape or a slight bulge in the middle of the screen while under high wind pressure, and after the high wind pressure subsides, the load on the one or more springs (applied via the screen receiver) is relieved cause said spring(s) to expand and push away the screen receiver thereby tensioning the attached screen to provide an aesthetically pleasing, tight screen. Thus, the novel spring arrangement within the tracks/track assemblies provide a self-tensioning system that operates effectively while accounting for fluctuations in wind conditions that advantageously ensures increased screen and track assembly lifespan while reducing frequent maintenance (and/or replacement) associated with currently marketed screens, track/track assemblies, or a combination thereof.

Exemplary screen receivers and track assemblies 100 are depicted, for example, in an embodiment as shown in FIGS. 1-6. For example, FIG. 1 depicts a perspective view of two assembled track assemblies 100, forming an assembled track assembly, having a parallel arrangement respective to one another with a motorized, retractable screen 200 positioned between and attached to each assembly such that the screen extends between the two track assemblies. The motorized, retractable screen 200 is readily deployed and retracted between the two track assemblies via a motor (not shown). The use of two track assemblies is exemplary only and not intended to be limiting. Rather, a single track assembly may be utilized with another track to hold ends of a screen. At least one of the track assemblies of the assembled track assembly may be formed with the elongate channel and features as described in detail herein, and with reference to FIGS. 1-6, in accordance with an embodiment.

In accordance with an embodiment, a direction of mounting each track assembly may be such that the elongate track extends in a vertical direction. According to an embodiment, in certain aspects, all portions of the assembly remain vertically stationary during screen deployment and retraction.

The track assembly 100 has a fixed track including an elongate channel 140 having a length to configured to extend vertically, in accordance with an embodiment. In the illustrated exemplary embodiment of FIGS. 1-6, each track assembly 100 extends in a vertical direction, connected to and extending along a vertical structure 300 at each side, such as a column or a walls of a doorway (not to scale) or opening, to ensure that the screen 200 may vertically span the entire length of the column or doorway 300 as well as horizontally span a width between each structure 300, which may, in some instances, crate a temporarily enclosed space when the screen is deployed.

Figure 2:
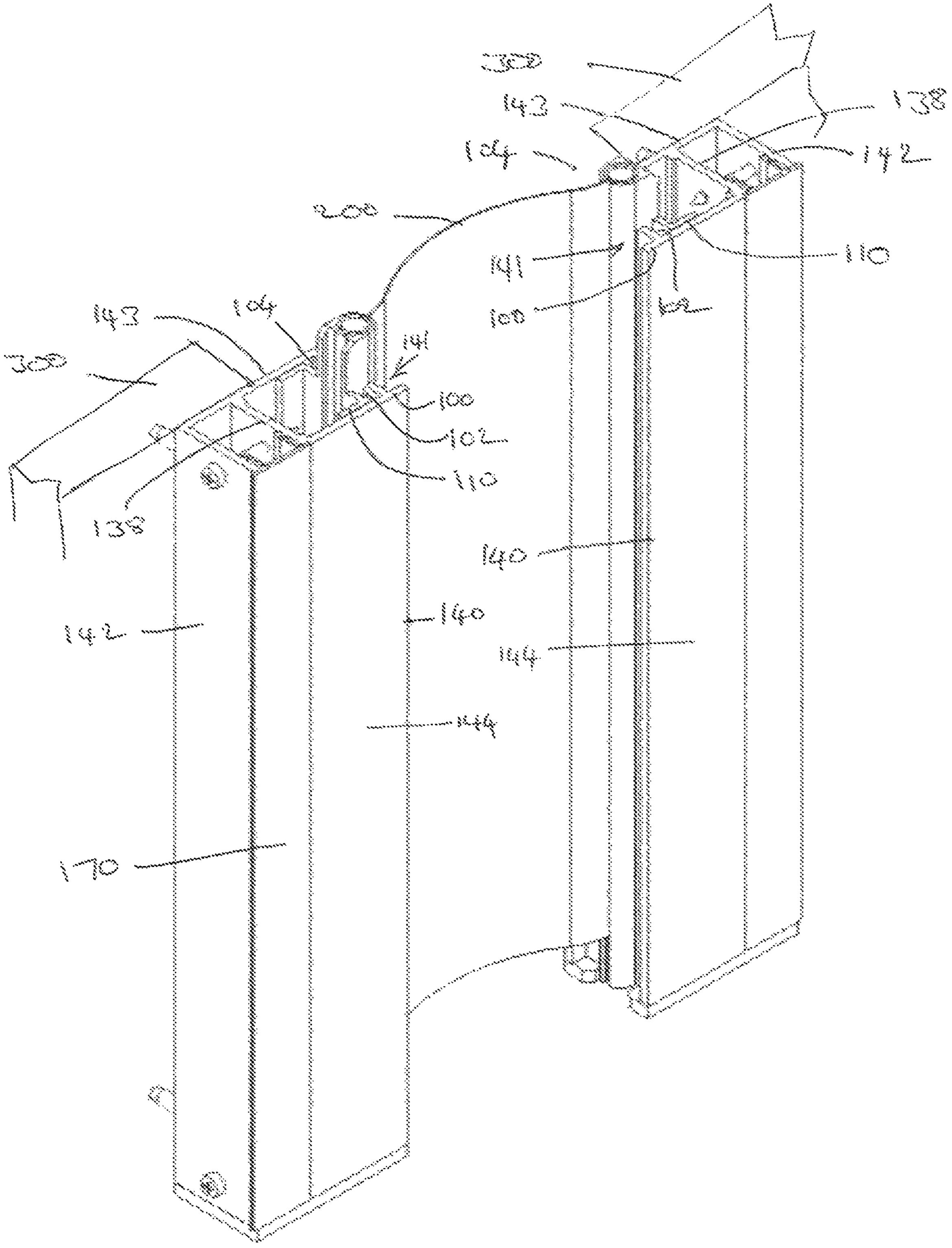
FIG. 2 further depicts the track assembly and screen of FIG. 1 during extreme inclement weather in which spring(s) of each assembly are compressed allowing the screen to expand out of plane to the maximum extent, in accordance with an embodiment.
Figure 3:
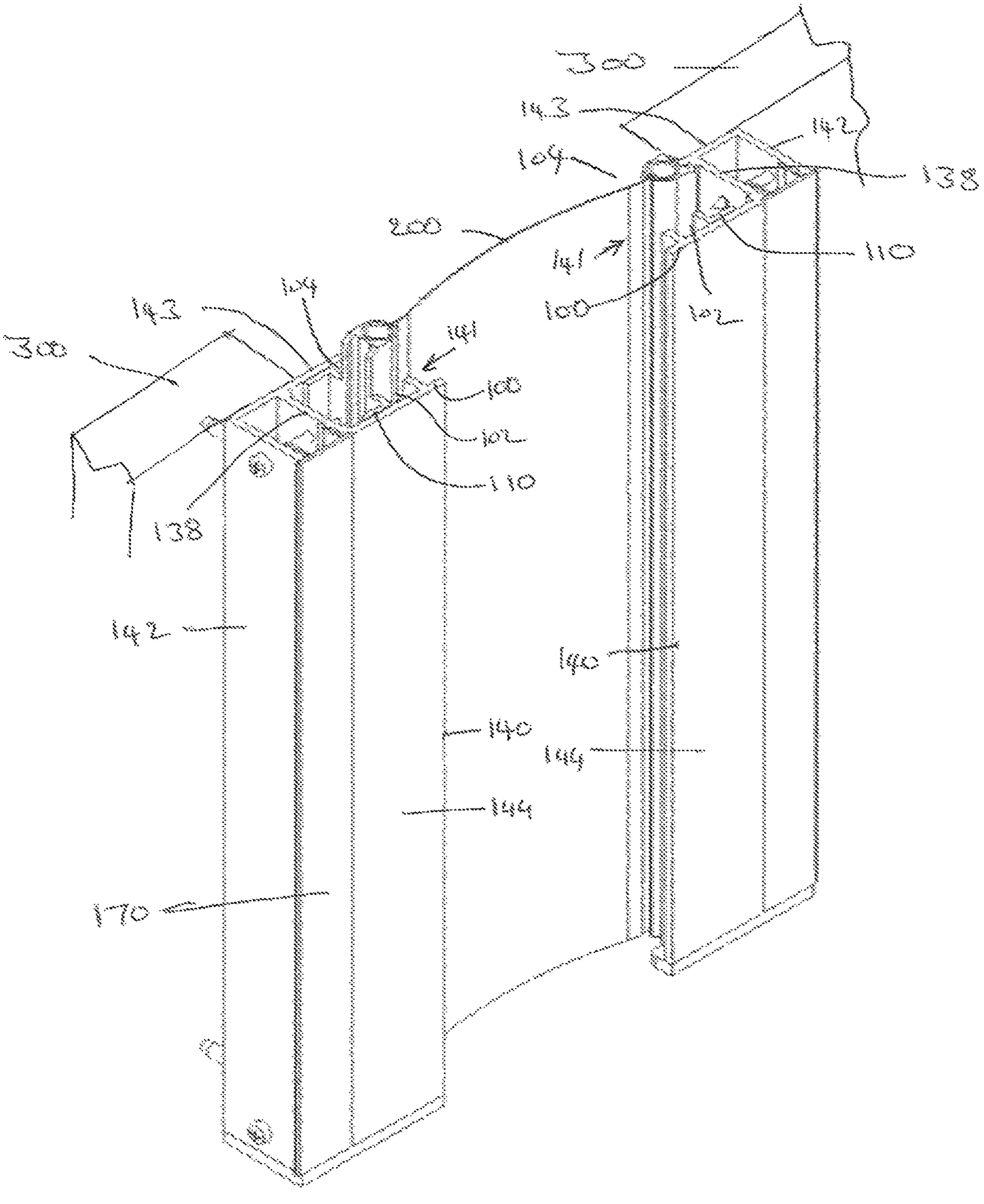
FIG. 3 further depicts the track assembly and screen of FIG. 1 during typical inclement weather in which the spring(s) of each assembly are partially compressed allowing the screen to expand out of plane to some degree and keeping the screen edge forces to a minimal and in balance with spring load, in accordance with an embodiment.

FIG. 2 shows a perspective view of FIG. 1 further demonstrating use and operation of the spring arrangement that provides the above discussed "self-tensioning" system is compressed under load to almost flat shape during, for example, extreme weather conditions. FIG. 3 shows a perspective view of FIG. 1 further demonstrating the novel spring arrangement that provides the above discussed "self-tensioning" system when spring(s) are partially compressed under nominal load, for example, typical varying weather conditions.

Figure 4:
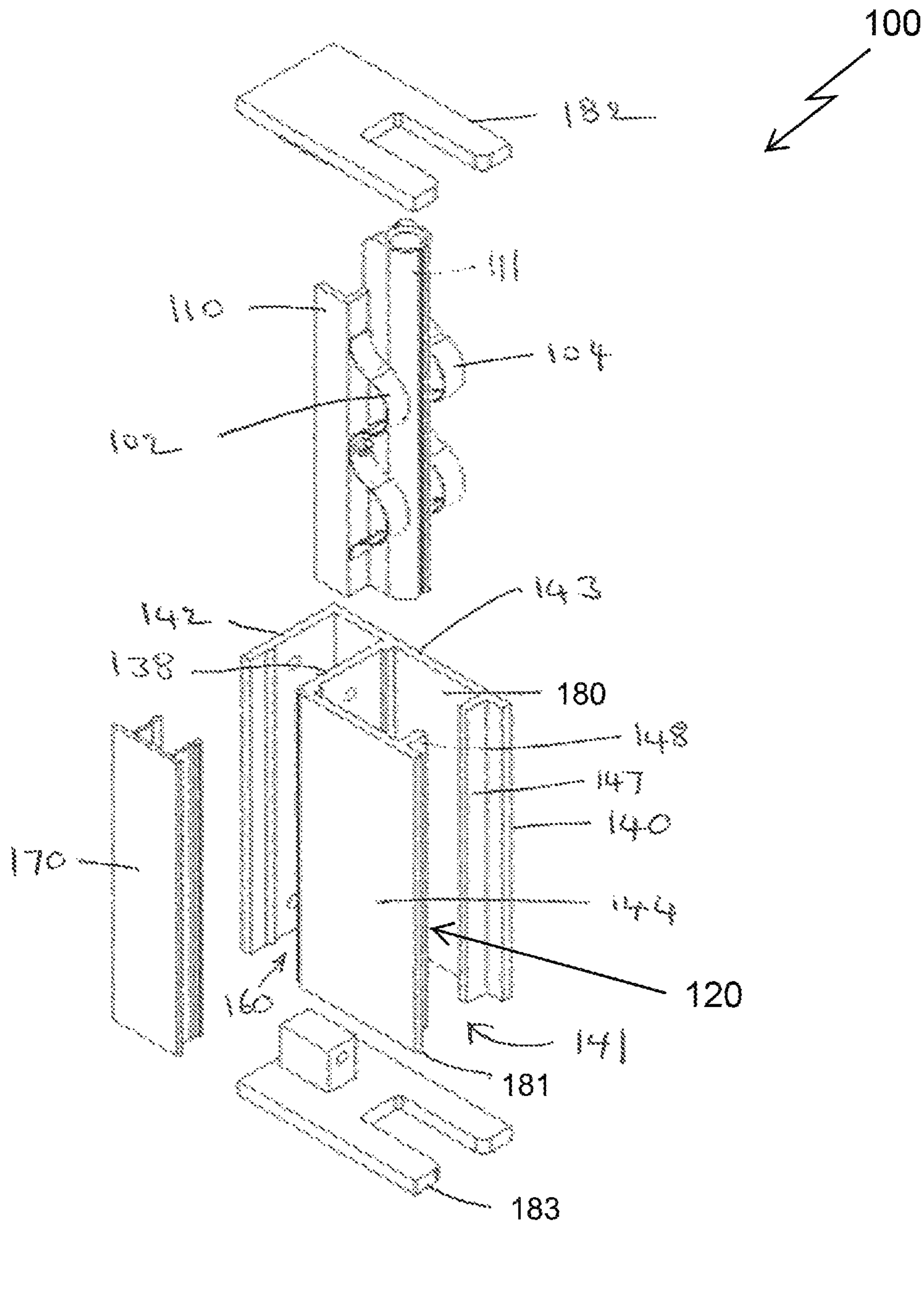
FIG. 4 is an exploded 3D view of a portion of one track assembly in accordance with an embodiment, showing a screen receiver and one example of springs, in accordance with an embodiment, along with compartments/regions of the elongate channel and top and bottom covers and a removable elongate cover for one of the compartments/regions, in accordance with an embodiment.
Figure 5:
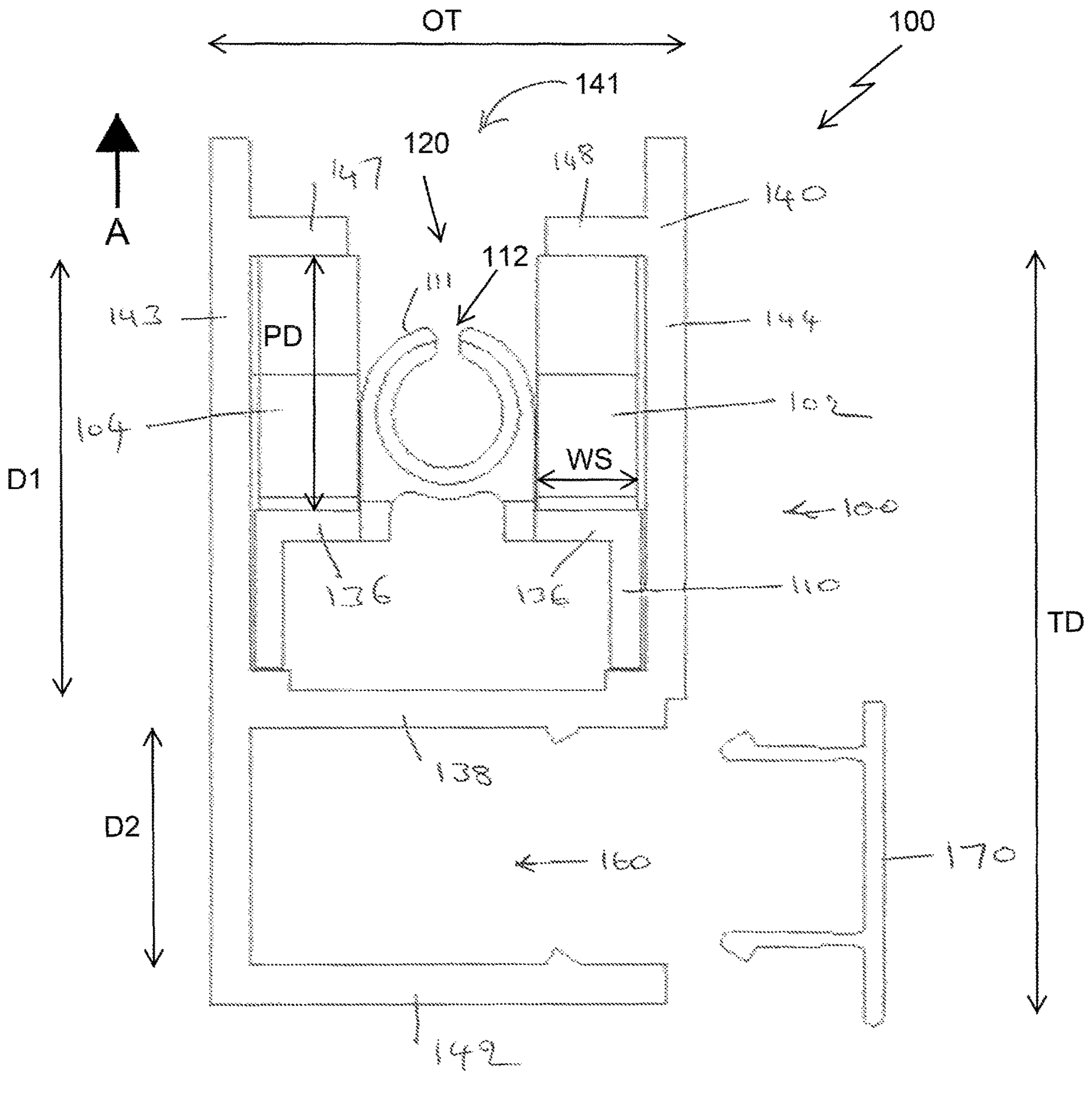
FIG. 5 is a top view of the track assembly showing the screen receiver and spring(s) being positioned inside the elongate channel and under normal conditions, in accordance with an embodiment.
Figure 6:
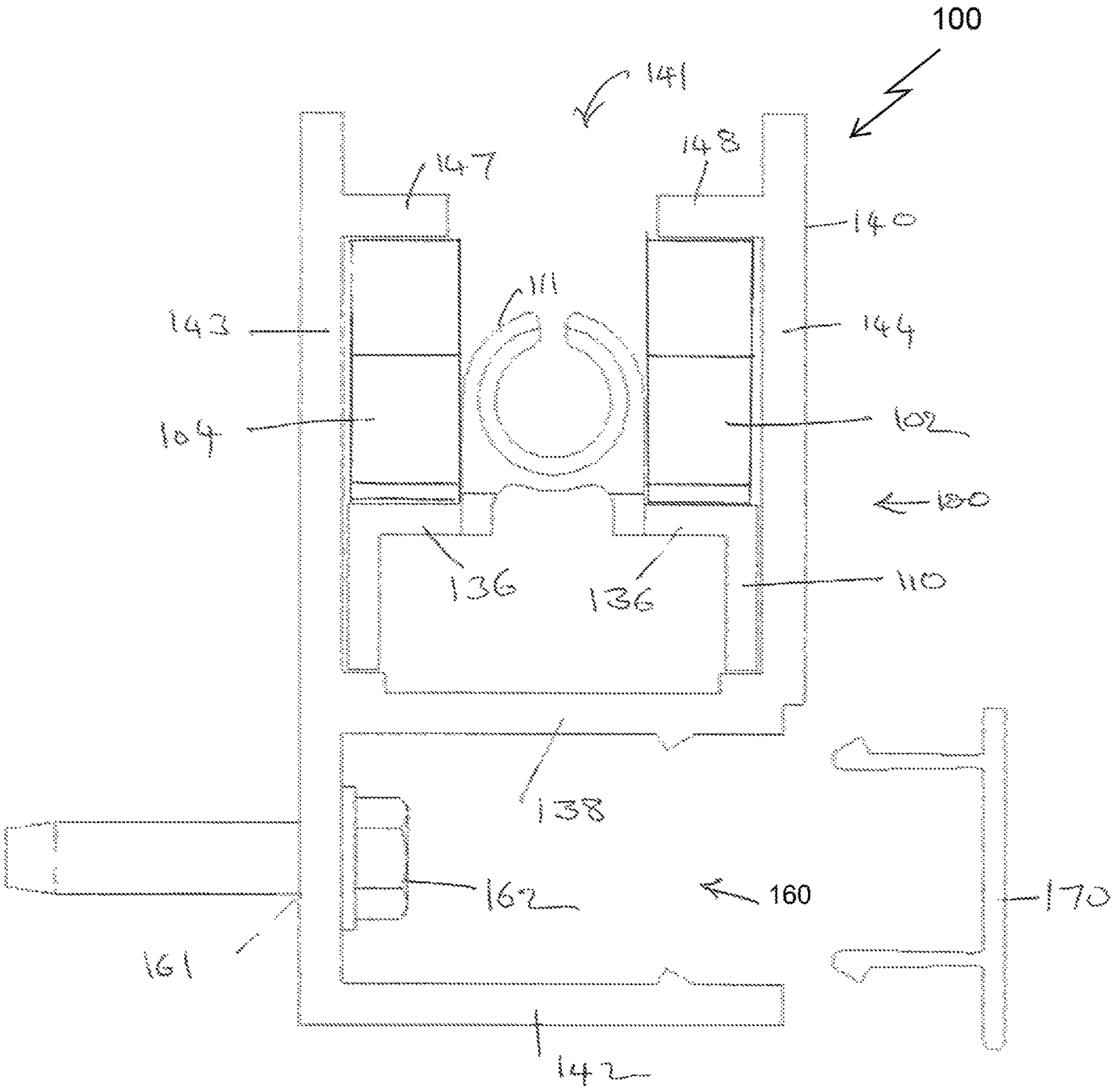
FIG. 6 is the top view of FIG. 5 further showing a typical fastener extending through one of the side walls of the elongate channel and one of the regions for attaching the track assembly to a desired surface.

As shown in FIGS. 1, 2 and 3, the track assembly 100 includes a screen receiver 110 and a fixed track with an elongate channel 140. FIGS. 4-6 show in greater detail that the track has an open side 141, an end wall 142, a middle/interior partition wall 138, and two side walls 143, 144. As discussed later below, in accordance with an embodiment, the open side 141 may include one or more (optional) partition walls (e.g., two walls 147 and 148) as shown in FIGS. 4, 5 and 6. The screen receiver 110 (and screen 200) is provided in its first position, or normal/default position, as shown in FIG. 1, with no application of force thereto. FIGS. 2-3 show the screen receiver 110 (and screen 200) in a second position, i.e., in a compressed position, which is a position away from the first position, where tension or force is applied. In a case where the elongate channel is configured to extend in of the fixed track extends a vertical direction, and the screen receiver is adapted to move relatively perpendicular, i.e., generally horizontally, within the elongate channel 140.

As further shown in FIGS. 1, 2 and 3, the screen receiver 110 is adapted to receive a keder portion of a screen 200 on one side of the receiver. The at least one spring is also provided in the elongate channel 140. In accordance with an exemplary embodiment, such as shown in the example of FIGS. 4-6, two springs 102 and 104 may be used with the screen receiver 110. In one embodiment, the two springs 102 and 104 are arranged on either side of the screen receiver 110 (the sides being defined with reference to a similar direction as the overall thickness OT; e.g., being positioned on either side of a channel 111, as described later below). The springs 102 and 104 may each have a length that extends within a length of the elongate channel 140 and/or the movable track/screen receiver 110. In a particular embodiment, illustrated as an example in FIGS. 4-6, springs 102 and 104 are wave springs. That is, each spring 102 and 104 includes multiple waves along its entire length. Accordingly, it should be understood that springs 102, 104 may be a set or strip of wave springs, including a multitude of waves spaced along its length (see FIG. 4 which shows two waves as a representative but non-limiting example of the waves included along the length of the set or strip), are provided in the elongate channel 140, along and/or within the length thereof. More specifically, two sets or strips of springs may be provided on either side of the screen receiver 110 (e.g., either side of channel 111), in accordance with an embodiment. The number of waves and the free height of each wave in the wave springs 102 and 104 are not intended to be limiting. Further, the entire length of each strip (i.e., the length that is provided within the length of the elongate channel) is not intended to be limiting. In an embodiment, the entire length of the strip or the at least one spring may be less than the length of the elongate channel. In one embodiment, the at least one spring or strip may be positioned along at least half of a length of the elongate channel. In another embodiment, the entire length of the strip or at least one spring may be similar to a length of the elongate channel. In a particular embodiment, the entire length of the springs 102 and 104 may be approximately four feet +/−1 foot. While these two wave springs are shown in detail in these figures and described below, it should be noted that the type and number of springs used as part of track assembly 100 is not intended to be limiting. Indeed, a single wave spring may be used, and the spring(s) may be a wave spring, a coil spring, a compression spring, or a flat spring. In some embodiments, any combination of these types of springs may be used.

As previously noted, the springs 102 and 104 are configured to be compressed during movement of the screen receiver 110 in the channel in a first direction (from its first position). Per FIG. 5, for example, force in the direction of arrow A will move the screen receiver towards the open end 141 of the elongate channel 140, thereby compressing springs 102 and 104. Because of the pre-defined spring rate of the springs 102 and 104 (e.g., spring rate between 5 lbs/inch and 300 lbs/inch, both inclusive) and compression thereof, when applied force subsides, the springs 102 and 104 will expand to force the screen receiver 110—and thus the screen received or held therein—in a second, opposite direction (opposite arrow A; back to its first position).

For example, in embodiments, the screen receiver 110 is Split-O shaped, i.e., C-shaped and includes an elongate channel 111 formed thereon that has an opening 112 that receives the screen 200 (e.g., a screen keder interlock, a Zipper interlock, a rope, a beaded chain, or any similar interlock known in the art) while providing sufficient clearance such that the screen may easily move through the C-shaped/Split-O shaped channel. As previously described, the opening 112 extends along the screen receiver 110 in a same direction as the open side 141 of the elongate channel 140 and may be in the center of the screen receiver for accessibility. The screen is designed to be easily deployed and retracted as desired through the C-shaped/Split-O shaped channel via the open side 141 or end.

In an embodiment, the interior of the elongate channel 140 includes a first compartment 160 and a second compartment 120 each provided within the two side walls 143 and 144, such as shown in FIGS. 5 and 6. In one embodiment, the two side walls can be parallel with one another. However, they do not need to be parallel. Instead, the two side walls can be any shape and need not be parallel or flat structures. Thus, while the walls are referred to as being parallel herein, it must be understood that this is in reference to only one, non-limiting example. In addition, the first and second "compartments" 160, 120 are also referred to herein synonymously as "regions," as the term compartments is not intended to refer to a full enclosure. The first compartment or region 160 may be defined between the end wall 142 and an interior partition wall 138 that extends perpendicularly between and connects to the two side walls 143 and 144. The second compartment or region 120 may be defined from the interior partition wall 138 towards the open side 141. As shown in FIGS. 5 and 6, the two side walls 143 and 144 extend from at least the interior partition wall 138 to the open side 141. In the exemplary illustrated embodiment, side wall 143 extends from end wall 142 to the open side 141. In an embodiment, a stepped portion may be provided at corners of the partition wall 138 and each side wall 143, 144. This portion may include an outer cut-out part on an outer surface of the elongate channel that acts as a ledge to seat the cover 170, such that the cover 170 may be positioned such that its outer surface is flush with an outer surface of side wall 144, for example. Also, an inner step may be provided within the compartment 120 or region at said corners of the stepped portion, in order to receive and align the screen receiver 110 within the region or compartment.

In one embodiment, the elongate channel 140 further includes at least one optional partition stop wall extending from at least one of the two side walls 143 and/or 144 towards a center of the elongate channel 140 while still allowing access to the screen receiver 110. Accordingly, in such instances, the screen receiver 110 is adapted to move between the interior partition wall 138 and the partition stop wall(s). That is, screen receiver 110 is configured to move towards the open side 141 of the elongate channel 140 to compress the at least one spring relative to/against the partition wall, and configured to move back towards and against the interior partition wall 138 based on a spring force from the at least one spring. As shown in FIGS. 5 and 6, two partition stop walls 147 and 148 may be provided. In this illustrative case, two walls 147 and 148 are included based on the type of springs 102 and 104 used in this illustrative embodiment and the design of the screen receiver 110. As shown, the screen receiver 110 includes two leg portions 136 extending from the channel 111, in accordance with an embodiment. The leg portions 136 each have an L-shaped cross section portion, including a lateral back wall (e.g., extending parallel to the partition stop walls 147, 148) and an extension leg which extends from the back wall and substantially parallel to the walls 143 and 144. During initial assembly with no tension, a bottom of each leg may be positioned at the inner side of stepped portion (e.g., on a step at the partition wall 138, as shown in FIG. 6), and a top surface of the lateral back wall is contact with the wave spring 102, 104. When assembled, the top surface of the lateral back wall may have a slight interference with wave peaks of the respective spring 102, 104 and hence compress the spring a bit to help hold them in place. However, compression is not required. Rather, the springs 102, 104 may be assembled with an interference fit within the elongate channel.

In an non-limiting embodiment, for the example shown in FIGS. 1-6, the depth D1 may be between approximately one inch to approximately two inches, the depth D2 of the first region may be approximately one inches to approximately two inches, an overall thickness OT may be from approximately one inch to approximately two inches, and a total depth TD may be from approximately two inches to approximately four inches.

In accordance with an embodiment, a depth or width of the leg portions 136 (i.e., a distance extending in the same direction as the screen, generally parallel to walls 143, 144) is approximately ¼ to ½ of the depth D1 of the second region 120. In an embodiment, the depth or width of the leg portions 136 is approximately ⅓ of the depth D1 of the second region 120. However, such distances are exemplary only and not intended to be limiting.

When the screen is under wind pressure and wants to collapse putting tension on the edges, the screen receiver 110 moves and its lateral back walls push on the wave springs 102, 104 and starts compressing them and moving closer to the partition walls 147, 148 and open side 141 or end. The legs are separated from the interior partition wall 137 as the wind pressure increases on the screen. The leg portions 136 assist in keeping the screen receiver 110 straight and parallel, while the screen is subject to forces (e.g., wind forces) which result in the receiver 110 moving in and out, and without twisting within the elongate channel 140. However, such is meant to be illustrative only. The springs 102 and 104 may be provided in the second region 120, between the screen receiver 110 and one of the partition stop walls, in accordance with an embodiment. Specifically, in an embodiment, the wave spring 102 is captured in a pocket (or compartment area) formed by the back wall of the leg portions 136 of screen receiver 110 and partition wall 148 of the elongate channel 140 and wall 144 and the elongate channel 111. Similarly, the wave spring 104 is captured in a pocket (or compartment area) formed by the back wall of the leg portions 136 of the screen receiver 110 and partition wall 147 of the elongate channel and wall 143 and the channel (i.e., on an opposite or other side). The depth PD of each pocket—and thus the spring(s)—is dependent upon a depth (or width) of the extension leg of the leg portions 136 and the depth D1 of the second region 120 (in this illustrated case, the depth D1 is defined between the partition wall 138 and partition wall 147 or 148), i.e., D1 minus depth of leg portion 136. Accordingly, movement of the screen receiver 110 towards the partition stop wall(s) 147 and/or 148 is configured to compress the spring(s) 102 and/or 104 with the pocket(s). As the screen receiver 110 moves within the elongate channel 140 during inclement weather due to the pressure load on the screen 200, these two pockets get smaller or larger simultaneously compressing the wave springs 102, 104. For example, and as shown in FIG. 1, when the two parallel track assemblies 100 are fully assembled and have a screen 200 attached there between, screen 200 is pulled tight (i.e., has a tight, aesthetically pleasing look) when wave springs 102 and 104 of the assembly are not greatly loaded and in full wave shape. However, as shown in FIG. 2, during extreme inclement weather (e.g., very high wind conditions, such as at high wind speed (~40 mph) and/or higher), the screen receiver 110 is configured to move within compartment 120 allowing the wave springs 102 and 104 to get fully compressed (i.e., bottom out, or hit a maximum compression or deflection) by the screen receiver, thereby allowing for maximum screen expansion. In addition, as shown in FIG. 0.3, once the extreme inclement weather starts subsiding (e.g., normal varying wind conditions), the wave springs 102 and 104 are partially loaded, i.e., set for expansion from their compression, and hence they push the screen receivers 110 relatively apart correspondingly always keeping the screen 200 tight between the two track assemblies, thus providing the screen with a tight, aesthetically pleasing look at all times.

As noted previously, the minimum/maximum compression or deflection amount of the spring(s) may be dependent upon a number of factors, including the placement of the spring(s) and the size of the features of the elongate channel. In an embodiment, wherein the spring(s) are provided in a pocket(s) (e.g., formed between the screen receiver 110 and one of the partition stop walls 147, 148 in the second region 120 of the elongate channel 140 (as described above with reference to FIG. 5 and also shown in the embodiment of FIG. 7)), the minimum/maximum compression or deflection amount of the spring(s) is dependent upon a depth PD of the pocket(s) formed. For example, if the depth PD of the pocket(s) holding spring(s) therein is within a range of approximately 0.5 inches to approximately 6.0 inches, then the spring(s) may be compressed or deflected a minimum of approximately 0.25 inches and a maximum of approximately 6.0 inches (+/−0.25) under wind pressure as a result of nominal wind speed and high wind speed respectively thereto, in accordance with an embodiment. In an embodiment, the depth PD of the pocket(s) is between approximately one inch +/−0.5 and approximately 11.0 inches +/−0.5. However, such examples are not intended to be limiting. Again, the depth PD and thus a compression movement of the spring(s) may be dependent upon the depth D1 of the second region 120 and the leg portions 136 of the screen receiver 110.

The screen receiver 110 can be stable at any point along its range of full motion defined by freely or slightly preloaded state installed spring position and fully compressed spring position depending on the pull force of screen and the balancing compressive resistance of the wave springs resulting in partial or full compression of the springs.

FIG. 4 specifically depicts the track assembly 100 in which the screen receiver 110 and elongate channel 140 are shown in an exploded view to show each of the components. As shown, in a disassembled state, the screen receiver 110 is initially outside of the elongate channel 140, but during assembly and install of the track assembly 100, the screen receiver 110 is securely positioned in the elongate channel 140.

As further shown in FIGS. 1, 2 and 3, the track assembly 100, and more specifically the elongate channel 140 of the fixed track, may be permanently or semi-permanently fixed to a vertical structure 300 such as a column or a doorway or a wall face opening. For example, as shown in FIG. 6, the elongate channel 140 may include a plurality of through holes 161 on side wall 143. The through holes 161 allow the elongate channel 140 to be permanently fixed to a vertical structure by advancing a fastener 162 (e.g., a screw or a bolt)

through the through holes into the vertical structure 300, thereby fixing the elongate channel 140 to the vertical structure 300.

As further depicted in FIGS. 1 to 6, in an embodiment, the elongate channel 140 includes a secondary channel disposed along wall 144 of the two side walls, with an elongate opening that is accessible in a direction perpendicular to the open side 141 of the elongate channel 140. That is, as previously noted, the interior of the elongate channel 140 may include another (first) compartment 160 provided within the two side walls 143 and 144, between the end wall 142 and interior partition wall 138, which includes the secondary channel 160. This compartment or region may include multiple through holes 161 extending along its length (e.g., in the illustrated case, in the vertical direction) for attaching the track to a structure via fasteners. After advancing each fastener 162 through the through holes 161, the fastener head is fully disposed within the secondary channel 160 and preferably does not extend beyond the outermost surface of the side wall 144. As further shown in FIGS. 1 through 6, in an embodiment, the track assembly 100 further includes a removable elongate cover 170 that removably attaches to and/or fits with the secondary channel 160 to conceal the fastener head(s) in the secondary channel 160. In certain aspects, the elongate cover 170 extends the entire length of the secondary channel 160 and may be configured for a Snap fit, interference fit, or sliding engagement with the secondary channel 160.

The elongate channel 140 further includes a top end 180 and a bottom end 181 positioned at ends of the two side walls 143 and 144, shown generally (not to scale) in FIGS. 1-3. The elongate channel 140 may be open at the top and said bottom thereof. To provide the spring track assembly 100 with a more aesthetically pleasing look, top end 180 and/or bottom end 181 may be covered with top cover 182 and/or bottom cover 183, respectively. In certain aspects, top cover 182 is fastened to the top 180 of the elongate channel after positioning the screen receiver therein, and bottom cover 183 is fastened to the bottom 181 of the elongate channel. Top cover 182 and bottom cover 183 may further secure screen receiver and wave springs in the elongate channel while concurrently restricting vertical movement of the screen receiver 110 in the elongate channel. As further shown in FIG. 4, in certain aspects, top cover 182 and bottom cover 183 include recessed/cut out portions that align with an end of the screen receiver such that the screen received in the screen receiver does not contact the top or bottom cover. This arrangement allows the screen to be easily deployed and retracted without contacting the top and bottom covers.

Figure 7:
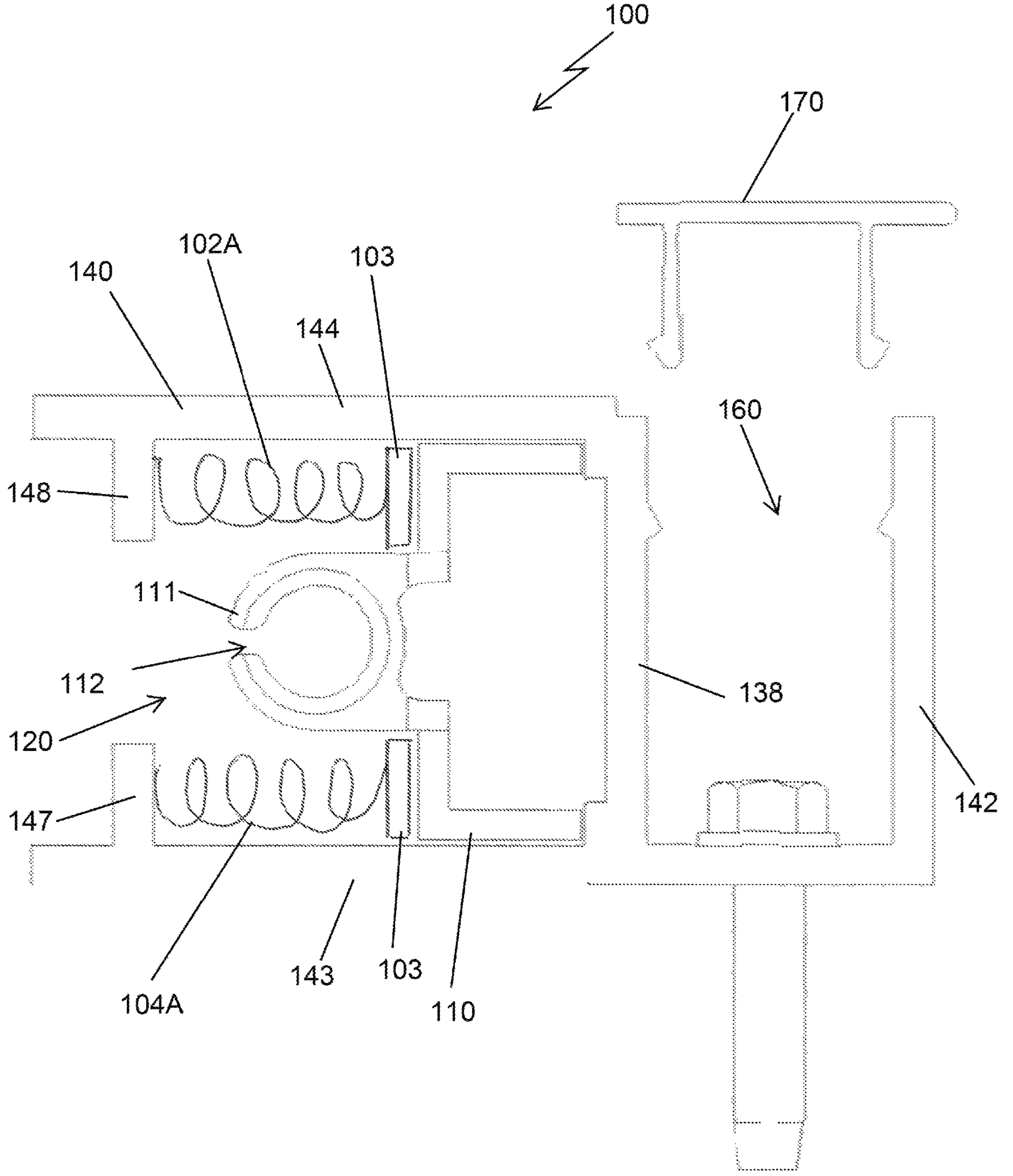
FIG. 7 depicts a top view of the track assembly of FIG. 1 including another example of spring(s) for use with the screen receiver and elongate track, in accordance with another embodiment.
Figure 8:
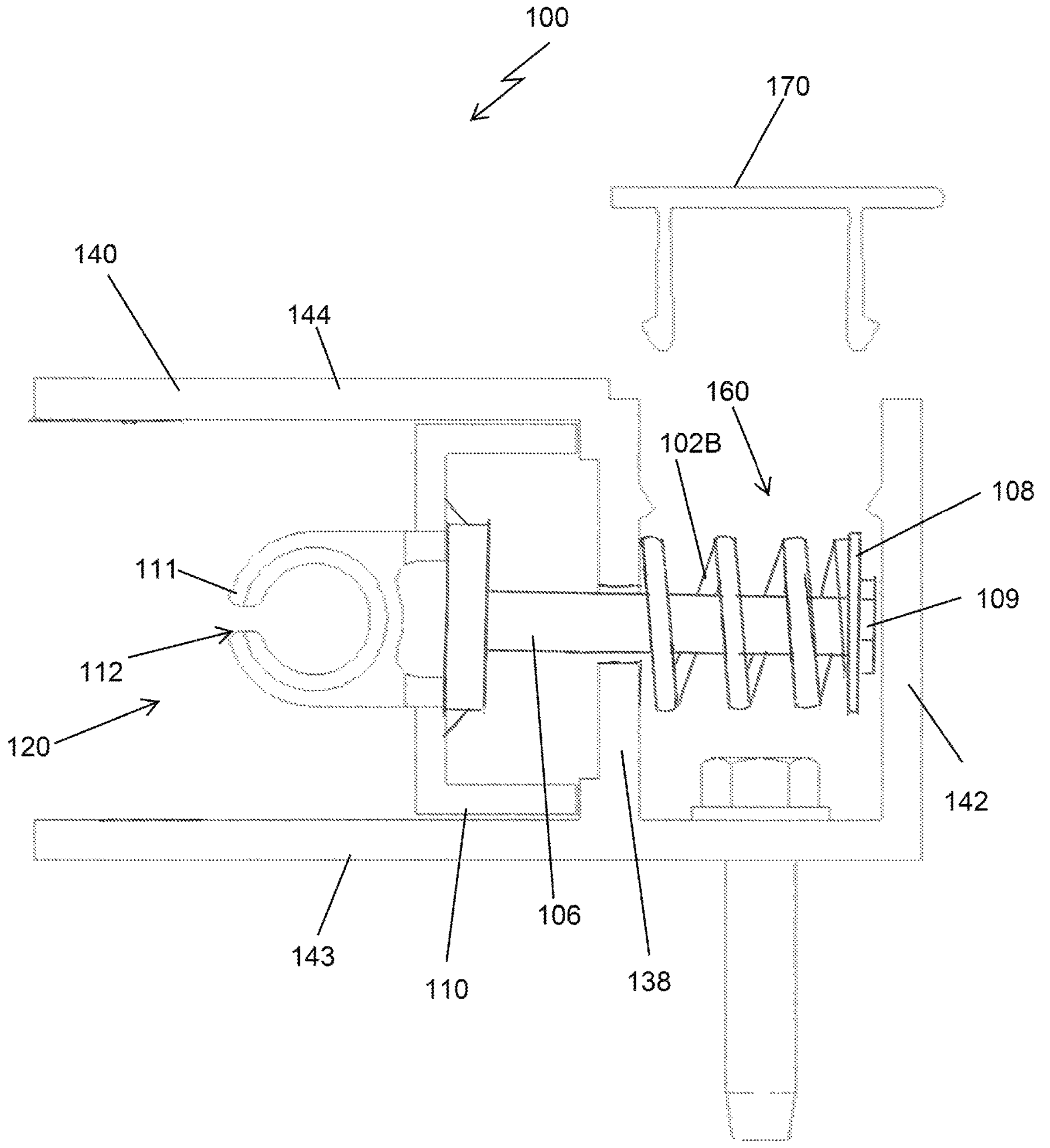
FIG. 8 depicts a top view of the track assembly of FIG. 1 including yet another example of a spring for use with the screen receiver and elongate track, in accordance with yet another embodiment.
Figure 10:
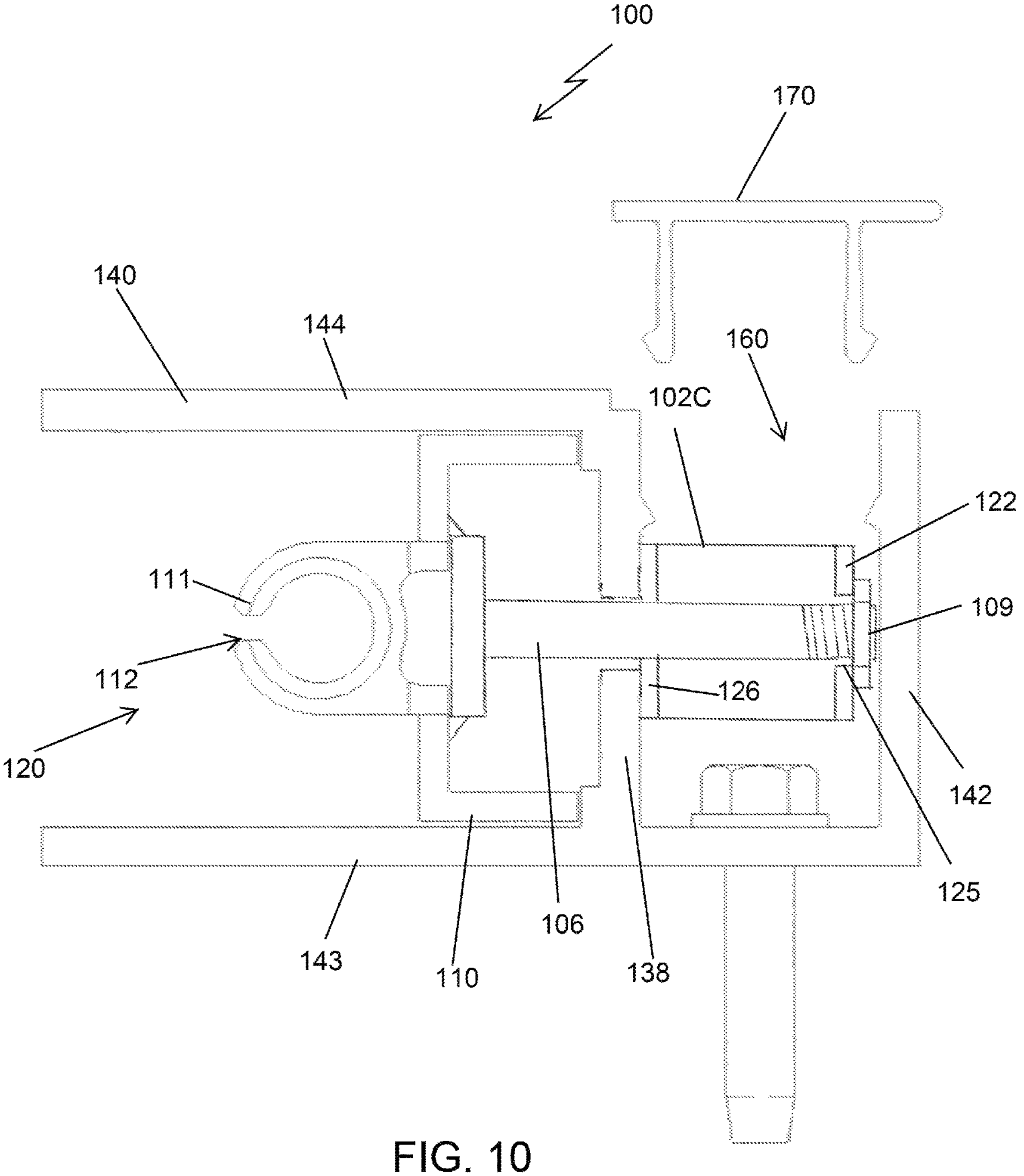
FIG. 10 depicts a top view of the track assembly of FIG. 1 including still yet another example of the flat spring of FIGS. 9A and 9B for use with the screen receiver and elongate track, in accordance with still yet another embodiment.

FIGS. 7-8 and 10 show alternate embodiments of the track assembly 100, including options for the at least one spring. For purposes of clarity and brevity, like elements and components throughout the Figures are labeled with same designations and numbering as discussed with reference to FIGS. 1-6. Thus, although not discussed entirely in detail herein, one of ordinary skill in the art should understand that various features associated with the track assemblies of FIGS. 7, 8, and 10 are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

FIG. 7 shows a track assembly 100 with a track having an elongate channel 140 including compartments 120 and 160, screen receiver 110, partition walls 147, 148, and 138, and end wall 142 as previously described. In this exemplary illustrative embodiment, two springs 102A and 104A are shown, which operate in a similar manner to springs 102 and 104 as described in detail previously. In particular, springs 102A and 104A are coil springs each attached to a strip of material 103 (e.g., a metal strip) which is inserted into the same pocket as the wave springs 102, 104 of FIGS. 5-6. In an embodiment, a multitude of springs 102A and 104A are attached along the full length of each strip of material 103, i.e., springs are spaced from each other in a vertical direction and provided between a top to a bottom of the strip and thus the elongate channel 140. Accordingly, it should be understood that a set or strip of springs 102B are provided in the elongate channel 140, along and/or within the length thereof. More specifically, two sets of springs 102B may be provided on either side of the screen receiver 110 (e.g., either side of channel 111), in accordance with an embodiment. In one embodiment, the coil springs 102B may be spaced along the strip 103 in a similar manner as the waves of the wave springs 102, 104 (each wave distance). Further, as noted previously, the springs (and thus the strip 103) need not extend an entire length of the length of the elongate channel. That is, the springs and/or the strip 103 may be positioned along a portion thereof (e.g., along a 4 or 5 foot length of the channel) and do not necessarily need to be placed along the entire length of the elongate channel. In one embodiment, the springs may be positioned along at least half of a length of the elongate channel. In an embodiment, the springs may be designed to be placed along a strip that extends from a top to a bottom of the elongate channel. In one embodiment, the springs 102A and 104A may be equidistantly spaced along at least a portion of a length of the strip 103.

The aforementioned ranges of spring rates similarly apply to the coil springs 102A 104A of FIG. 7. In addition, in accordance with an embodiment, the springs 102A and 104A may have a similar minimum and maximum compression/deflection range as described with reference to FIGS. 1-6, i.e., such that the minimum/maximum compression or deflection amount of the spring(s) is dependent upon a depth PD of the pocket(s) formed between the spring receiver 110 and a partition wall 147, 148. For example, if the depth PD of the pocket(s) holding springs 102A and 104A therein is within a range of approximately 0.5 inches to approximately 6 inches, then the springs 102A and 104A may be designed such that they are compressed or deflected a minimum of approximately 0.25 inches and a maximum of approximately 6 inches (+/−0.25) under wind pressure as a result of nominal wind speed and wind pressure as a result of high wind speed respectively thereto, in accordance with an embodiment. In an embodiment, the depth PD of the pocket (s) is between approximately one inch +/−0.5 and approximately 11.0 inches +/−0.5. Again, such depths are not intended to be limiting.

FIG. 8 shows a track assembly 100 with a track having an elongate channel 140 including compartments 120 and 160, screen receiver 110, partition wall 138, and end wall 142 as previously described. In this exemplary illustrative embodiment, studs 106 are connected (e.g., welded) to the moveable track portion/screen receiver 110 in a back portion thereof (near legs 136). The studs 106 extend through the interior partition wall 138 and are inserted into the first region 160. In an embodiment, a multitude of studs 106 are provided along the vertical direction and spaced from one another (e.g., providing a stud approximately every twelve inches from a top to a bottom of the elongate channel 140). A compression spring or coil spring 102B is provided on each stud, secured with a plate 108 and a nut 109 to hold the spring 102B in place. Accordingly, it should be understood that a set of springs 102B are provided in the elongate channel 140, along and/or within the length thereof. In this exemplary illustrative embodiment, the set of springs 102B are positioned relatively behind the screen receiver 110 (with reference to the depth of the elongate channel), and only one set of springs is required along and/or within the length of the elongate channel 140. When the screen receiver 110 is pulled by the screen when screen bulges due to wind or shrinkage, the coils 102B compress and then they extend when the wind pressure is removed. As shown, one or more partition walls (e.g., walls 147 and/or 148) are not required in such a design, since coil springs 102B (unlike wave springs or coil springs) need not be secured and held within the second region 120).

Figure 9A:
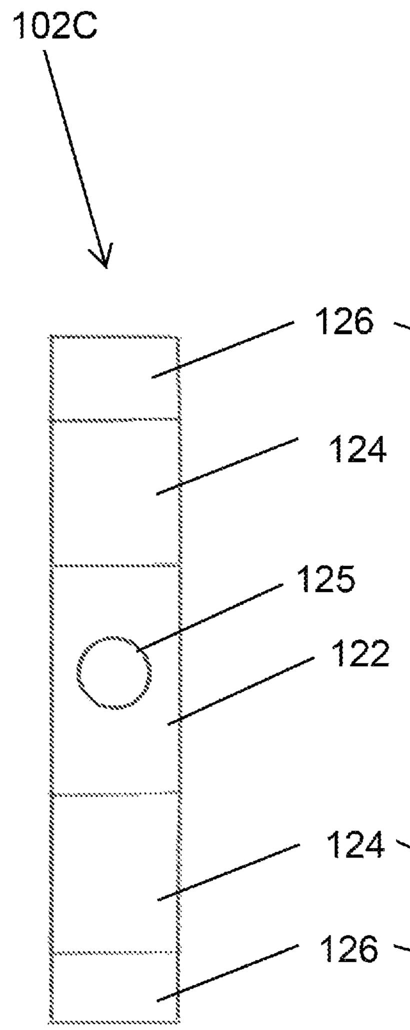
FIGS. 9A and 9B illustrate front and side views, respectively, of a flat spring configured for use with the track assembly of FIG. 1, in accordance with still yet another embodiment.
Figure 9B:
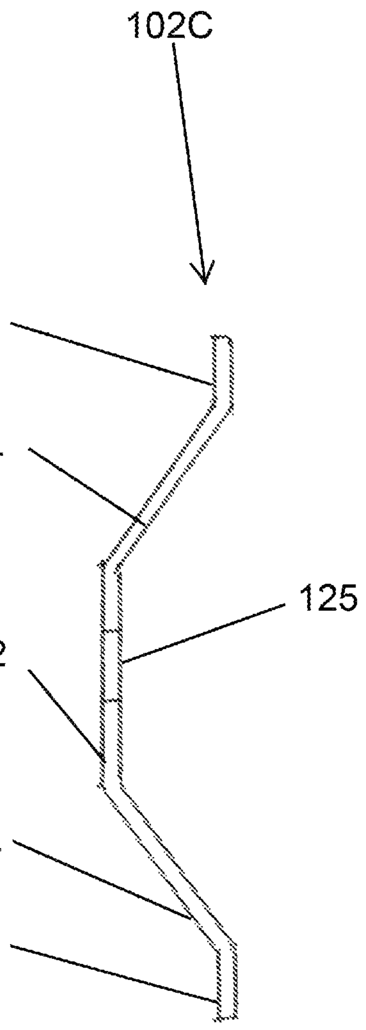

Flat springs is another option for the spring(s) used in the track assembly. FIGS. 9A and 9B illustrate an example of such a flat spring 102C. For example, each flat spring 102C may include a peak portion 122 with legs 124 on either side thereof. The peak portion includes an opening 125 or hole therethrough, e.g., for receipt of a stud 106 or bolt. Optionally, each the legs 124 include a foot 126. While the flat spring 102C of FIGS. 9A-9B is shown with edges and defined portions, it should be noted that those skilled in the art would understand that flat springs 102C may include curved and/or rounded edges; accordingly, the depiction of FIGS. 9A-9B is exemplary and for illustrative purposes only. In an embodiment, the coil springs of FIG. 8 are replaced with flat springs. This bent spring plate flattens and spreads along the length under load as the studs pulls on it under wind load. Specifically, FIG. 10 shows an example of utilizing such flat springs 102C in an embodiment of a track assembly 100. The track assembly 100 of FIG. 10 includes a track having an elongate channel 140 including compartments 120 and 160, screen receiver 110, partition wall 138, and end wall 142 as previously described. In this exemplary illustrative embodiment, studs 106 are connected (e.g., welded) to the moveable track portion/screen receiver 110 in a back portion thereof (near legs 136). The studs 106 extend through the interior partition wall 138 and are inserted into the first region 160 in a similar manner as shown in FIG. 8. In addition, a multitude of studs 106 are provided along the vertical direction and spaced from one another (e.g., providing a stud approximately every twelve inches from a top to a bottom of the elongate channel 140). Flat spring 102C is provided on each stud, secured with a nut 109 through each opening 125 to hold the spring 102C in place. The legs 124 (or their feet 126) of the springs 102C are positioned against the interior partition wall 138, one the side within the first region 160. Accordingly, it should be understood that a set of springs 102C are provided in the elongate channel 140, along or within the length thereof. In this exemplary illustrative embodiment, the set of springs 102C are positioned relatively behind the screen receiver 110 (with reference to the depth of the elongate channel 140), and only one set of springs is required along the length of the elongate channel 140. When the screen receiver 110 is pulled by the screen when screen bulges due to wind or shrinkage, the flat springs 102C compress and extend when the wind pressure is removed. As shown, one or more partition walls (e.g., walls 147 and/or 148) are not required in such a design, since flat springs 102C (unlike wave springs or coil springs) need not be secured and held within the second region 120.

Although not explicitly shown in each of the Figures, it should be understood that the exemplary embodiments of the spring(s) as shown in FIGS. 7-10 may be utilized as part of an assembled track assembly including two track assemblies with elongate channels with such spring(s) therein. Again, such an assembled track assembly may include a motorized, retractable screen attached thereto and extending between the two track assemblies. At least one of the track assemblies of the assembled track assembly may be formed with the elongate channel and features as described with reference to FIGS. 1-6, in accordance with an embodiment.

The aforementioned ranges of spring rates similarly apply to the spring 102B of FIG. 8 and the spring 102C of FIG. 10, e.g., spring 102B and spring 102C may have a spring rate between 5 lbs/inch and 300 lbs/inch (both inclusive), in accordance with embodiments herein; in another embodiment, the spring rate is between 5 lbs/inch and 100 lbs/inch. In accordance with another embodiment, the at least one spring has a spring rate between 10 lbs/inch and 100 lbs/inch. In yet another embodiment, the at least one spring has a spring rate between 5 lbs/inch and 25 lbs/inch. In an embodiment, the minimum/maximum compression or deflection amount of the spring 102B and/or 102C is dependent upon a depth D2 of the first region 160. For example, if the first region 160 has a depth D2 within a range of approximately 0.5 inches to approximately 2 inches, then the springs 102B and 102C may be designed such that they are compressed or deflected a minimum of approximately 0.25 inches and a maximum of approximately 2.0 inches (+/−0.25) under wind pressure as a result of nominal wind speed and wind pressure as a result of high wind speed respectively thereto, in accordance with an embodiment. In accordance with embodiments herein, because the spring 102B and/or 102C are provided in a first region 160, the first region 160 has a larger depth D2 to accommodate the spring, bolt, etc. In an embodiment, the depth D2 of the first region 160 may be approximately one to eight inches, for example; thus, the compression/deflection amount of the spring 102B and/or 102C may be approximately 0.25 inches under wind pressure as a result of nominal wind speed and a maximum of approximately 8.0 inches (+/−0.25) under wind pressure as a result of high wind speed thereto, in accordance with an embodiment.

Further, as noted previously, the springs 102B and studs 106 of FIG. 8 and/or springs 102C of FIG. 10 need not extend an entire length of the length of the elongate channel. That is, the springs and/or studs may be positioned along a portion thereof (e.g., along a 4 or 5 foot length of the channel) and do not necessarily need to be placed along the entire length of the elongate channel. In one embodiment, the spring(s) may be positioned along at least half of a length of the elongate channel. In an embodiment, the springs 102B (and studs) or springs 102C may be placed along a length from a top to a bottom of the elongate channel. In one embodiment, the springs 102B or springs 102C may be equidistantly spaced along at least a portion of a length of the elongate channel.

The screen receiver 110, the elongate channel 140, elongate cover 170, and/or top cover 182 and the bottom cover 183 may be formed of metal, a thermoplastic resin, or a combination thereof. For example, in certain aspects, the screen receiver 110, the elongate channel 140, elongate cover 170, and/or top cover 182 and bottom cover 183 may be formed of metal, a molded thermoplastic resin sufficient to withstand harsh weather conditions and the movements disclosed herein. Such materials are not intended to be limiting, however. It should be further noted that the screen receiver 110 disclosed herein may be adapted to receive a screen keder through, for example, a Split-O shaped channel 111. However, the screen receiver 110 may have any desired predetermined shape (e.g., triangular, square, rectangular shape) that can receive screen 200 there-through. As alluded to above, the screen receiver 110 may be adapted to receive a zipper interlock, a rope, a beaded chain, or any similar interlock known in the art associated with the disclosed retractable screen.

In addition to the improvements and advantages described throughout this disclosure, the use of the at least one spring in a track assembly as disclosed herein reduces noise with regards to movement of the screen receiver within the track. That is, unlike the prior art systems which use magnets that disconnect with nominal wind variations—and thus cause noise and friction as a result of movement of part(s) within a track or rail—the disclosed designs further provide limited to zero noise during applied wind pressure, since the spring (s) not only provides absorption with regards to force and noise, but also less friction between parts within the track assembly [as they move]. Further, by using a lower spring rate, the disclosed designs allow for compression at lower (e.g., nominal) wind speeds and bottoming out at higher (e.g., high, extreme and/or higher) wind speeds, which reduces forces applied to the screen receiver (and keder) and allows the screen to better operate while remaining aesthetically pleasing with limited to no wrinkles. Furthermore, installation of the disclosed track assembly is easier as the spacing between track assemblies (e.g., when using two on either side of a doorway or opening) & tolerances may be increased by having some small compression in the springs at installation, if needed.

The foregoing description provides embodiments of the disclosure by way of example only. It is envisioned that other embodiments may perform similar functions and/or achieve comparable results. Any and all such equivalent embodiments and examples are within the scope of the present disclosure and are intended to be covered by the appended claims. Also, while the track assembly 100 has a fixed track including an elongate channel 140 with a length that is configured to extend vertically, in accordance with an embodiment, it is envisioned that the track assembly 100 may be positioned horizontally. Further, while a motorized screen (i.e., motor and screen) is noted for use with said track assembly 100, such is not intended to be limiting. That is, a manual screen, i.e., secured and pulled by hand, may be used with the disclosed track assembly.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A track assembly comprising:

a metal U-shaped track configured to be fixed to a structure, the metal U-shaped track having an elongate channel comprising an open side, an end wall, an interior, and two side walls, the interior of the elongate channel comprising a first region and a second region each provided within the two side walls, the first region defined between the end wall and an interior partition wall that extends between and connects to the two side walls, and the second region defined from the interior partition wall towards the open side, and the two side walls extending from at least the interior partition wall to the open side; and a screen receiver and at least one wave spring positioned within the elongate channel, the screen receiver configured to receive a portion of a screen therein, wherein the at least one wave spring has a plurality of waves, the waves comprising a plurality of peaks and valleys, and the plurality of waves is designed for (a) compression during movement of the screen receiver in a first direction upon application of force thereto and (b) expansion to force the screen receiver towards a second direction opposite the first direction when the application of force is reduced, wherein the plurality of waves of the at least one wave spring have a first peak to valley amplitude when the force is applied thereto and compresses the at least one wave spring, and a second peak to valley amplitude when the application of force is reduced and the at least one wave spring is expanded, and wherein the second peak to valley amplitude is greater than the first peak to valley amplitude, and wherein the at least one wave spring has a spring rate between 5 lbs/inch and 300 lbs/inch and is at least three feet long.

2. The track assembly according to claim 1, wherein the at least one wave spring has a spring rate between 10 lbs/inch and 100 lbs/inch.

3. The track assembly according to claim 1, wherein the at least one wave spring is configured to compress or deflect a minimum of approximately 0.25 inches under wind pressure as a result of nominal wind speed and a maximum of approximately 8.0 inches under wind pressure as a result of high wind speed thereto.

4. The track assembly according to claim 3, wherein the at least one wave spring is configured to compress or deflect a minimum of approximately 0.25 inches under wind pressure as a result of nominal wind speed to a maximum of approximately 2.0 inches under wind pressure as a result of high wind speed thereto.

5. The track assembly according to claim 4, wherein the at least one wave spring is configured to compress or deflect a minimum of approximately 0.25 inches under wind pressure as a result of nominal wind speed to a maximum of approximately 0.75 inches under wind pressure as a result of high wind speed thereto.

6. The track assembly according to claim 1, wherein the two side walls are parallel to one another.

7. The track assembly according to claim 1, wherein the interior partition wall extends perpendicularly between and connects to the two side walls.

8. The track assembly according to claim 1, further comprising at least two wave springs positioned within the elongate channel, wherein the screen receiver includes two sides, and wherein each of the at least two wave springs is positioned on either side of the screen receiver.

9. The track assembly according to claim 1, wherein the screen receiver and the at least one wave spring are disposed within the second region such that said screen receiver is configured to move towards the open side of the elongate channel to compress each wave of the at least one wave spring and configured to move back towards and against the interior partition wall based on a spring force from the at least one wave spring.

10. The track assembly according to claim 1, wherein the screen receiver comprises a receiver elongate channel having an opening extending along a same direction as the open side of the elongate channel of the metal U-shaped track, the opening being accessible in a direction parallel to the two side walls and being provided in a center of the screen receiver, such that the receiver elongate channel is accessible through the open side of the elongate channel.

11. The track assembly according to claim 1, wherein the first region comprises a secondary channel having an elongate opening that is accessible in a direction perpendicular to the open side of the elongate channel.

12. The track assembly according to claim 11, further comprising a removable elongate cover for removably covering a length of the elongate opening of the first region.

13. The track assembly according to claim 1, wherein the elongate channel comprises a top and a bottom positioned at ends of the two side walls, wherein the elongate channel is open at said top and said bottom thereof, and wherein the top and the bottom are configured to be removably covered with removable top and bottom covers, respectively, said removable top and bottom covers being included with the track assembly.

14. The track assembly according to claim 1, wherein the second region has a depth greater than one inch.

15. The track assembly according to claim 1, wherein the elongate channel is configured to extend in a vertical direction, and wherein the screen receiver is adapted to move relatively horizontally within the second region toward and away from the interior partition wall.

16. The track assembly according to claim 15, wherein the elongate channel further comprises a partition stop wall extending from at least one of the two side walls towards a center of the elongate channel while still allowing access to the screen receiver, and wherein the screen receiver is adapted to move between the interior partition wall and the partition stop wall.

17. The track assembly according to claim 16, wherein the at least one wave spring is provided between the screen receiver and the partition stop wall, such that a portion of each wave of the at least one wave spring is provided against the partition stop wall and wherein movement of the screen receiver towards the partition stop wall is configured to compress the at least one wave spring.

18. The track assembly according to claim 1, wherein the at least one wave spring is positioned along a at least half of a length of the elongate channel.

19. The track assembly according to claim 1, where in the at least one wave spring is attached to the screen receiver using a screw, rivet, clip, or fastener.

20. The track assembly according to claim 12, wherein the screen receiver and/or the elongate cover are formed of metal.

21. A track assembly comprising:

a metal U-shaped track configured to be fixed to a structure, the metal U-shaped track having an elongate channel comprising an open side, an end wall, an interior, and two side walls, the interior of the elongate channel comprising a first region and a second region each provided within the two side walls, the first region defined between the end wall and an interior partition wall that extends between and connects to the two side walls, and the second region defined from the interior partition wall towards the open side, and the two side walls extending from at least the interior partition wall to the open side; and a screen receiver and at least one wave spring both provided in the second region, the screen receiver configured to receive a portion of a screen therein;

wherein the at least one wave spring has a plurality of waves, the waves comprising a plurality of peaks and valleys, and the plurality of waves is designed for (a) compression during movement of the screen receiver in a first direction upon application of force thereto and (b) expansion to force the screen receiver towards a second direction opposite the first direction when the application of force is reduced, wherein the plurality of waves of the at least one wave spring have a first peak to valley amplitude when the force is applied thereto and compresses the at least one wave spring, and a second peak to valley amplitude when the application of force is reduced and the at least one wave spring is expanded, and wherein the second peak to valley amplitude is greater than the first peak to valley amplitude, and wherein the at least one wave spring is configured to compress or deflect a minimum of approximately 0.25 inches under wind pressure as a result of nominal wind speed to a maximum of approximately 6.0 inches under wind pressure as a result of high wind speed thereto, and is at least three feet long.

* * * * *